(12) United States Patent
Kahen et al.

(10) Patent No.: US 7,777,233 B2
(45) Date of Patent: Aug. 17, 2010

(54) DEVICE CONTAINING NON-BLINKING QUANTUM DOTS

(75) Inventors: Keith B. Kahen, Rochester, NY (US); Xiaofan Ren, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 296 days.

(21) Appl. No.: 11/928,292

(22) Filed: Oct. 30, 2007

(65) Prior Publication Data

US 2009/0109435 A1    Apr. 30, 2009

(51) Int. Cl.
   *H01L 27/15* (2006.01)
(52) U.S. Cl. .............. 257/79; 257/21; 257/22; 257/40; 257/51; 257/89; 257/98
(58) Field of Classification Search ........... 356/317; 313/503
   See application file for complete search history.

(56) References Cited

U.S. PATENT DOCUMENTS

| 7,056,471 | B1 | 6/2006 | Han et al. | |
|---|---|---|---|---|
| 2003/0003300 | A1 | 1/2003 | Korgel et al. | |
| 2005/0214536 | A1 | 9/2005 | Schrier et al. | |
| 2005/0214967 | A1* | 9/2005 | Scher et al. | 438/63 |
| 2006/0175601 | A1* | 8/2006 | Lieber et al. | 257/19 |
| 2007/0183471 | A1* | 8/2007 | Vuckovic et al. | 372/50.11 |

FOREIGN PATENT DOCUMENTS

| EP | 1 787 659 | 5/2007 |
|---|---|---|
| WO | WO 03/003982 | 1/2003 |
| WO | WO 2005/001889 | 1/2005 |

OTHER PUBLICATIONS

He Hua et al., "Single Nonblinking CdTe Quantum Dots synthesized in Aqueous Thiopropionic Acid," Angewandte Chemie International Edition, vol. 45, 2006, pp. 7588-7591.

M. Nirmal et al., "Fluorescence Intermittency in Single Cadmium Selenide Nanocrystals," Nature, Nature Publishing Group, London, UK, vol. 383, Oct. 31, 1996, pp. 802-804.

M.T. Harrison et al., "Wet chemical synthesis and Spectroscopic Study of CdHgTe Nanocrystals with Strong Near-infrared Luminescence," Materials Science and Engineering B, Elsevier Sequoia, Lausanne, CH, vol. 69-70, Jan. 1, 2000, pp. 355-360.

Tang et al, Organic electroluminescent diodes, Appl. Phys. Lett. 51, 913-915 (1987).

Burroughes et al, Light-emitting diodes based on conjugated polymers, Nature 347, 539 (1990).

(Continued)

*Primary Examiner*—N Drew Richards
*Assistant Examiner*—Kyoung Lee
(74) *Attorney, Agent, or Firm*—Raymond L. Owens

(57) ABSTRACT

An optoelectronic device including two spaced apart electrodes; and at least one layer containing ternary core/shell nanocrystals disposed between the spaced electrodes and having ternary semiconductor cores containing a gradient in alloy composition and wherein the ternary core/shell nanocrystals exhibit single molecule non-blinking behavior characterized by on times greater than one minute or radiative lifetimes less than 10 ns.

18 Claims, 14 Drawing Sheets

OTHER PUBLICATIONS

Lee et al, Synthesis and characterization of colloidal ternary ZnCdSe semiconductor nanorods, Jour. of Chemical Physics 125, 164711 (2006).

S. Hohng et al, Near Suppression of Quantum Dot Blinking in Ambient Conditions, J. Am. Chem. Soc. 126 1324-1325, 2004.

Murray et al, Synthesis and Characterization of Nearly Monodisperse CdE (E=S, Se, Te) Semiconductor Nanocrystallites, J. Am Chem, 1993, 115 pp. 8706-8715.

Fernando Stefani et al, Memory in quantum dot photoluminescence blinking, New Jour. of Physics, 7, 197, 2005.

Matoussi et al, Electroluminescence from heterostructures of poly(phenylene vinylene) and inorganic CdSe nanocrystals, J. Appl. Phys. 83, 7965 (1998).

Hikmet et al, Study of conduction mechanism and electroluminescence in CdSe/ZnS quantum dot composites, J. Appl. Phys. 93, 3509, (2003).

Coe et al, Electroluminescence from single monolayers of nanocrystals in molecular organic devices, Nature 420, 800 (2002).

Mueller et al, Multilayer Light-Emitting Diodes Based on Semiconductor Nanocrystals Encapsulated in GaN Charge Injection Layers, Nano Letters 5, 1039 (2005).

Larson et al, Water-Soluble Quantum Dots for Multiphoton Fluorescence Imaging in Vivo, Science, 300, 1434-1436 (2003).

Achermann et al, Nanocrystal Based Light Emitting Diodes Using High Efficiency Nonradiative Energy Transfer for Color Conversion, Nano Lett 6, 1396 (2006).

Achermann et al, Picosecond Engery Transfer in Quantum Dot Langmuir—Blodgett Nanoassemblies, J. Phys. Chem B107, 13782 (2003).

* cited by examiner

DEVICE CONTAINING NON-BLINKING QUANTUM DOTS

STATEMENT REGARDING FEDERALLY-SPONSORED RESEARCH OR DEVELOPMENT

This invention was made with Government support under Cooperative Agreement #DE-FC26-06NT42864 awarded by DOE. The Government has certain rights in this invention.

CROSS-REFERENCE TO RELATED APPLICATIONS

Reference is made to commonly assigned U.S. patent application Ser. No. 11/226,622 filed Sep. 14, 2005, entitled "Quantum Dot Light Emitting Layer" by Keith B. Kahen; U.S. patent application Ser. No. 11/683,479 filed Mar. 8, 2007, entitled "Quantum Dot Light Emitting Device" by Keith B. Kahen; U.S. patent application Ser. No. 11/770,8334 filed Jun. 29, 2007, entitled "Light-Emitting Nanocomposite Particles" by Keith B. Kahen and U.S. patent application Ser. No. 11/926,538 filed Oct. 29, 2007, entitled "Making Colloidal Ternary Nanocrystals" by Keith B. Kahen et al, the disclosures of which are incorporated herein.

FIELD OF THE INVENTION

The present invention relates to applications using non-blinking nanocrystals, and particularly to non-blinking core/shell nanocrystals with ternary cores of CdZnSe.

BACKGROUND OF THE INVENTION

Colloidal semiconductor nanocrystals, or quantum dots, have been the focus of a lot of research. Colloidal quantum dots, hereto within referred to as quantum dots or nanocrystals, are easier to manufacture in volume than self-assembled quantum dots. Colloidal quantum dots can be used in biological applications since they are dispersed in a solvent. Additionally, the potential for low cost deposition processes make colloidal quantum dots attractive for light emitting devices, such as LEDs, as well as other electronic devices, such as, solar cells, lasers, and quantum computing devices. While potentially broader in their applicability than self-assembled quantum dots, colloidal quantum dots do have some attributes that are comparatively lacking. For example, self-assembled quantum dots exhibit relatively short radiative lifetimes, on the order of 1 ns, while colloidal quantum dots typically have radiative lifetimes on the order of 20-200 ns. Colloidal quantum dots also exhibit blinking, characterized by a severe intermittency in emission, while self-assembled quantum dots do not have this characteristic.

Of particular interest are II-VI semiconductor nanocrystals. These nanocrystals have size-tunable luminescence emission spanning the entire visible spectrum. In photoluminescent applications, a single light source can be used for simultaneous excitation of different-sized dots, and their emission wavelength can be continuously tuned by changing the particle size. Since they are also able to be conjugated to biomolecules, such as, proteins or nucleic acids, this photoluminescence property makes them an attractive alternative for organic fluorescent dyes classically used in biomedical applications. Additionally, the tunable nature of the emission makes quantum dots well suited for full color display applications and lighting. As a result of their well-established high-temperature organometallic synthetic methods (Murray et al, J. Am. Chem. Soc. 115, 8706-8715 1993) and their size-tunable photoluminescence (PL) across the visible spectrum, CdSe nanocrystals have become the most extensively investigated quantum dots (QD).

As noted by Hohng et al (J. Am. Chem. Soc. 126 1324-1325 (2004)), colloidal semiconductor quantum dots are also brighter and far more photostable than organic dyes, making them particularly interesting for biological applications. It also has been reported in the open literature that surface passivation of quantum dots with a semiconductor layer having a wider band gap or with polymers improves the optical properties of quantum dots, such as, quantum yield and photobleaching. The blinking behavior of quantum dots, however, is generally considered an intrinsic limitation that is difficult to overcome. This is unfortunate because growing applications in spectroscopy of single biological molecules and quantum information processing using single-photon sources could greatly benefit from long-lasting and nonblinking single-molecule emitters. For instance, in a recent application of single-dot imaging, the tracking of membrane receptors was interrupted frequently due to the stroboscopic nature of recording. Blinking can also reduce the brightness in ensemble imaging via signal saturation. Furthermore, blinking limits the use of colloidal quantum dots in luminescent applications such as single molecule LEDs.

A few groups have been working on solutions to the colloidal quantum dot blinking problem, especially for biological applications. It was found in 2004 by Hohng et al (Hohng et al., J. Am. Chem. So. 126, 1324-1325 (2004)) that quantum dot blinking could be suppressed by passivating the QD surface with thiol moieties. The experiments by Hohng et al were conducted with CdSe/ZnS quantum dots that showed inherent blinking behavior. Larson et al studied encapsulating the QDs within an amphiphilic polymer (Larson, et al., Science 300, 1434-1435, 2003), using water soluble CdSe/ZnS QDs. The results of Hohng et al and Larson et al do not solve the intrinsic problems resulting in blinking dots, they only control the environment at the surface of the dots in order to mitigate the problem. Both approaches are only useful in end applications that remain in solution and allow particular surface passivations.

In addition to the problem of blinking, colloidal quantum dots suffer from increased radiative lifetimes as compared with their self-assembled counterparts. Radiative lifetime is defined as the reciprocal of the first-order rate constant for the radiative step, or the sum of these rate constants if there is more than one such step (IUPAC Compendium of Chemical Terminology, $2^{nd}$ Edition (1997)). Short radiative lifetimes are desirable in order to compete successfully with non-radiative recombination events, such as, Forster energy transfer.

Although quantum dots containing CdSe cores are arguably the most studied and best understood of the quantum dots, some researchers are looking at more complex quantum dots with ternary rather than binary compositions. U.S. Pat. No. 7,056,471 by Han et al discloses processes and uses of ternary and quaternary nanocrystals (quantum dots). The nanocrystals described by Han et al are not core/shell quantum dots, rather they are homogeneously alloyed nanocrystals (also referred to as nanoalloys). Although Han et al do not address the issue of blinking in their disclosure, Stefani et al us use nanoalloy dots made by the disclosed process for a study of photoluminescence blinking (Stefani et al, New Journal of Physics 7, 197 (2005)). Stefani et al found that monocrystalline $Zn_{0.42}Cd_{0.58}Se$ QDs with an average diameter of 6.2 nm exhibited pholuminescence blinking. Although Stefani et al do not discuss the radiative lifetimes of their ternary nanocrystals, Lee et al have studied colloidal ternary ZnCdSe semiconductor nanorods (Lee et al, Journal of Chemical Physics 125, 164711 (2006)). Lee et al found that the ternary nanorods exhibit radiative lifetimes slightly longer than comparable CdSe/ZnSe core/shell nanorods. The CdSe/ZnSe nanorods had lifetimes around 173 ns, while the shortest lifetime for the ternary rods was observed to be 277 ns.

While researches in biological fields are looking to quantum dots to replace organic fluorescent dyes, quantum dots also hold promise for use in electronic devices. Research is ongoing into incorporating quantum dots into photovoltaics, solid-state lighting (mainly as quantum dot phosphors), electroluminescent displays as well as quantum computing devices. Semiconductor light emitting diode (LED) devices have been made since the early 1960s and currently are manufactured for usage in a wide range of consumer and commercial applications. The layers including the LEDs are based on crystalline semiconductor materials that require ultra-high vacuum techniques for their growth, such as, metal organic chemical vapor deposition. In addition, the layers typically need to be grown on nearly lattice-matched substrates in order to form defect-free layers. These crystalline-based inorganic LEDs have the advantages of high brightness (due to layers with high conductivities), long lifetimes, good environmental stability, and good external quantum efficiencies. The usage of crystalline semiconductor layers that results in all of these advantages, also leads to a number of disadvantages. The dominant ones are high manufacturing costs, difficulty in combining multi-color output from the same chip, and the need for high cost and rigid substrates.

In the mid 1980s, organic light emitting diodes (OLED) were invented (Tang et al, Appl. Phys. Lett. 51, 913 (1987)) based on the usage of small molecular weight molecules. In the early 1990s, polymeric LEDs were invented (Burroughes et al., Nature 347, 539 (1990)). In the ensuing 15 years organic based LED displays have been brought out into the marketplace and there has been great improvements in device lifetime, efficiency, and brightness. For example, devices containing phosphorescent emitters have external quantum efficiencies as high as 19%; whereas, device lifetimes are routinely reported at many tens of thousands of hours. In comparison to crystalline-based inorganic LEDs, OLEDs have much reduced brightness (mainly due to small carrier mobilities), shorter lifetimes, and require expensive encapsulation for device operation. On the other hand, OLEDs enjoy the benefits of potentially lower manufacturing cost, the ability to emit multi-colors from the same device, and the promise of flexible displays if the encapsulation issues can be resolved.

To improve the performance of OLEDs, in the later 1990s OLED devices containing mixed emitters of organics and quantum dots were introduced (Matoussi et al., J. Appl. Phys. 83, 7965 (1998)). The virtue of adding quantum dots to the emitter layers is that the color gamut of the device could be enhanced; red, green, and blue emission could be obtained by simply varying the quantum dot particle size; and the manufacturing cost could be reduced. Because of problems, such as, aggregation of the quantum dots in the emitter layer, the efficiency of these devices was rather low in comparison with typical OLED devices. The efficiency was even poorer when a neat film of quantum dots was used as the emitter layer (Hikmet et al., J. Appl. Phys. 93, 3509 (2003)). The poor efficiency was attributed to the insulating nature of the quantum dot layer. Later the efficiency was boosted (to ~1.5 cd/A) upon depositing a monolayer film of quantum dots between organic hole and electron transport layers (Coe et al., Nature 420, 800 (2002)). It was stated that luminescence from the quantum dots occurred mainly as a result of Forster energy transfer from excitons on the organic molecules (electron-hole recombination occurs on the organic molecules). Regardless of any future improvements in efficiency, these hybrid devices still suffer from all of the drawbacks associated with pure OLED devices.

Recently, a mainly all-inorganic LED was constructed (Mueller et al., Nano Letters 5, 1039 (2005)) by sandwiching a monolayer thick core/shell CdSe/ZnS quantum dot layer between vacuum deposited n- and p-GaN layers. The resulting device had a poor external quantum efficiency of 0.001 to 0.01%. Part of that problem could be associated with the organic ligands of trioctylphosphine oxide (TOPO) and trioctylphosphine (TOP) that were reported to be present post growth. These organic ligands are insulators and would result in poor electron and hole injection into the quantum dots. In addition, the remainder of the structure is costly to manufacture, due to the usage of electron and hole semiconducting layers grown by high vacuum techniques, and the usage of sapphire substrates.

Accordingly, it would be highly beneficial to construct an all inorganic LED based on quantum dot emitters which was formed by low cost deposition techniques and whose individual layers showed good conductivity performance. The resulting LED would combine many of the desired attributes of crystalline LEDs with organic LEDs.

For solid state lighting applications, the fastest route to high efficiency white LEDs is to combine either blue, violet, or near UV LEDs with appropriate phosphors. Replacing traditional optically pumped phosphors with quantum dot phosphors has many advantages, such as, greatly reduced scattering, ease of color tuning, improved color rendering index (CRI), lower cost deposition process, and broader wavelength spectrum for optical pumping. Despite these advantages, quantum dot phosphors have not been introduced into the marketplace due to some major shortcomings; such as, poor temperature stability and insufficient (10-30%) quantum yields for phosphor films with high quantum dot packing densities. In order to raise the quantum yield, many workers have lowered the packing density by incorporating appropriate filler (e.g., polymers or epoxies) with the quantum dots. The disadvantage of this approach is that the resulting quantum dot phosphor films are unacceptably thick (1 mm), as compared to the desired thickness of 10 μm. As has been discussed by Achermann et al (Achermann et al., Nano Lett 6, 1396 (2006)), reduced quantum yields for dense films is mainly the result of inter-nanoparticle interactions that lead to exciton transfer (Forster energy transfer) from emitting quantum dots to non-emitting quantum dots. Since the Forster energy transfer rate decreases rapidly with distance, d, as $1/d^6$, a way to minimize this effect is to form low density films (with the aforementioned problems). A more desirable approach would be to decrease the radiative lifetime of the quantum dot emitters in order to compete more effectively with the Forster energy process, while enabling dense films of quantum dot phosphors. More specifically, the Forster energy transfer time for drop cast films of quantum dots has been experimentally measured to be on the nanosecond time scale (Achermann et al., J. Phys. Chem. B107, 13782 (2003)).

To date, optoelectronic devices or biological studies have not had colloidal quantum dots available that are inherently non-blinking or that have short radiative lifetimes. Previous methods to create non-blinking dots are application dependent and not universally applicable across the technical disciplines utilizing quantum dots. While self-assembled quantum dots exhibit short radiative lifetimes, there are no reports of colloidal quantum dots exhibiting similar performance. Therefore, there is a need for colloidal quantum dots with inherent non-blinking behavior for use in biological and electronics applications. Additionally, there is a need for quantum dots with short radiative lifetimes that could be used in biological and optoelectronics applications.

SUMMARY OF THE INVENTION

It is an object of this invention to provide non-blinking core/shell ternary quantum dots for use in medical, biological, quantum computing, quantum cryptography, lighting and display applications.

This object is achieved by an optoelectronic device comprising:

(a) two spaced apart electrodes; and
(b) at least one layer containing ternary core/shell nanocrystals disposed between the spaced electrodes and having ternary semiconductor cores containing a gradient in alloy composition and wherein the ternary core/shell nanocrystals exhibit single molecule non-blinking behavior characterized by on times greater than one minute or radiative lifetimes less than 10 ns.

This object is further achieved by an inorganic light emitting device including a plurality of independently controlled light emitting elements, wherein at least one light emitting element comprises: a first patterned electrode; a second electrode opposed to the first electrode; and a polycrystalline inorganic light emitting layer comprising ternary core/shell nanocrystals within a semiconductor matrix formed between the electrodes, wherein the ternary core/shell nanocrystals have ternary semiconductor cores containing a gradient in alloy composition and exhibit single molecule non-blinking behavior characterized by on times greater than one minute or radiative lifetimes less than 10 ns.

This object is further achieved by a single photon optoelectronic device comprising two spaced apart electrodes; and a single ternary core/shell nanocrystal disposed between the two spaced apart electrodes and having a ternary semiconductor core containing a gradient in alloy composition and exhibiting single molecule non-blinking behavior characterized by on times greater than one minute or radiative lifetimes less than 10 ns.

This object is further achieved by an optical device comprising at least one layer containing ternary core/shell nanocrystal(s) wherein the ternary core/shell nanocrystal(s) have ternary semiconductor cores containing a gradient in alloy composition and exhibit single molecule non-blinking behavior characterized by on times greater than one minute or radiative lifetimes less than 10 ns; and a light source for optically exciting the ternary core/shell nanocrystal(s) so as to cause emission of light from the ternary core/shell nanocrystal(s).

This object is further achieved by a system including a marker actuable by radiation and used to detect a given analyte, comprising a ternary core/shell nanocrystal, having a ternary semiconductor core containing a gradient in alloy composition and exhibiting single molecule non-blinking behavior characterized by on times greater than one minute or radiative lifetimes less than 10 ns; and a molecule conjugated with the ternary core/shell nanocrystal and having a binding affinity for the analyte.

It is an advantage of the present invention that the non-blinking property of the ternary core/shell nanocrystals is not limited by type of solvent or type of surface ligands on the shell. This permits the nanocrystals to remain non-blinking in many environments and applications. It is an important feature of the invention that the ternary semiconductor cores have a gradient in alloy composition in order to achieve the non-blinking and short radiative lifetime properties. It is also an advantage that the ternary core/shell nanocrystals have much reduced radiative lifetimes compared to typical nanocrystals which enables enhanced quantum dot phosphor films, more efficient conventional LED devices, and single photon LED devices.

DETAILED DESCRIPTION OF THE INVENTION

Figure 1:
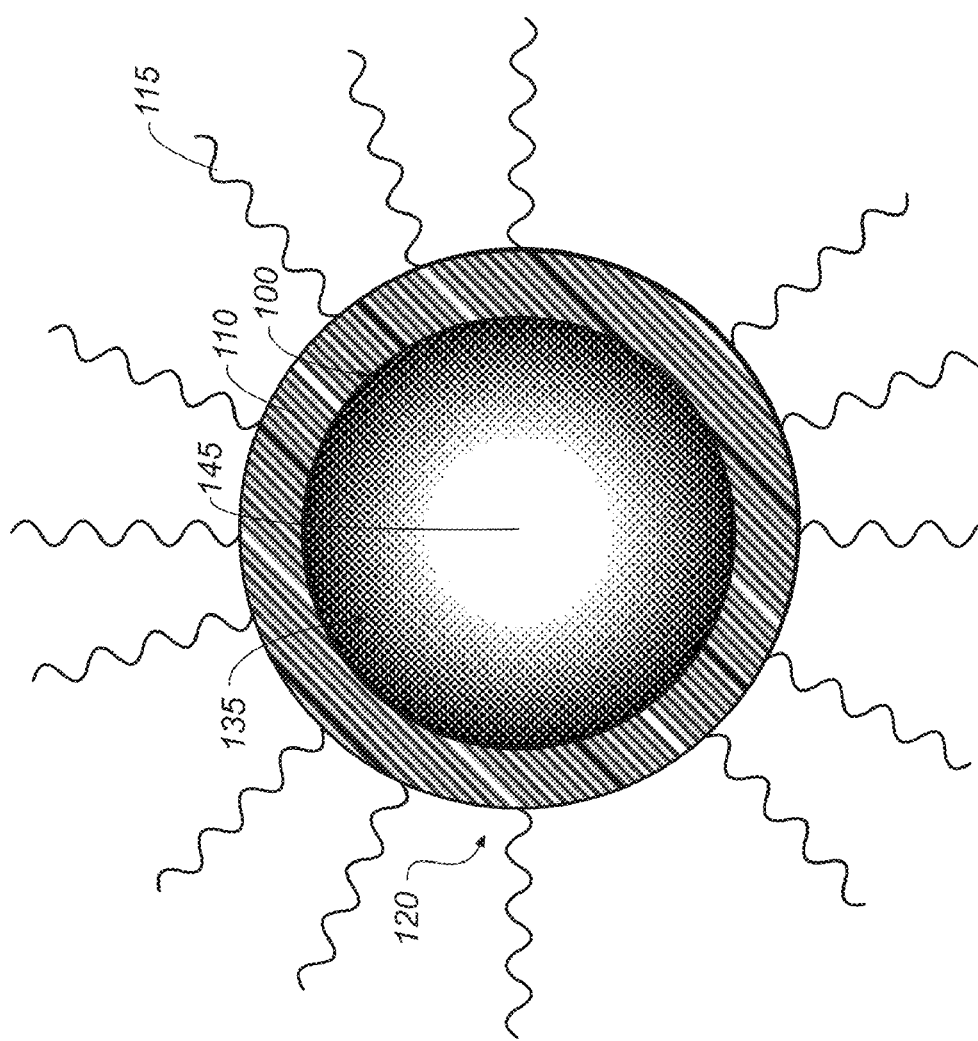
FIG. 1 shows a schematic of a ternary core/shell nanocrystal of the present invention.

As discussed above in the background section, it is advantageous to create nanocrystals (or quantum dots) that don't blink and have short radiative lifetimes. Single molecule blinking is initiated (M. Nirmal et al., Nature 383, 802 (1996)) when a nanocrystal is excited by multiphotons and two or more electron-hole pairs are created. Instead of the energy being released radiatively, one of the pairs loses its energy by Auger recombination and transfers its energy to one of the remaining electrons or holes. The excited electron or hole can then be ejected from the nanocrystal into the surrounding matrix. In the resulting ionized nanocrystal, the Auger recombination process dominates over radiative recombination and the nanocrystal remains dark in spite of continual excitation. The nanocrystal will remain dark until the ejected carrier finds its way (via tunneling, for example) back into the nanocrystal and returns the nanocrystal to the uncharged state. As can be seen by this phenomenological model, blinking could be reduced or stopped by preventing the ejection of a carrier from the nanocrystal interior. Forming a very thick semiconductor shell (as for self-assembled quantum dots) is the straightforward solution, however, implementing this in practice is difficult since defect formation in the shell (due to lattice mismatch) scales with shell thickness. A nanocrystal with defects in its shell would not only blink (since charge can be trapped at the defects), but would also exhibit a reduced quantum efficiency. Thus, one needs to seek different ways for keeping the carriers confined within the nanocrystal volume and away from the surface. One can see that by engineering a nanocrystal where the electrons and holes are more tightly confined to the center region (and away from the surface), that this will also lead to a reduction in the electron and hole radiative lifetime as a result of the Purcell effect.

It is well known that as a result of Anderson localization (P. Anderson, Phys. Rev. 109, 1492 (1958)), even slight randomization of atomic positions (15%) or atomic energy levels will lead to localization of charge carriers in a material. Semiconductor substitutional alloys exhibit random variations in the atomic energy levels, and as such, manifest charge localization effects (E. Economou et al., Phys. Rev. Lett. 25, 520 (1970). Given this result, a hypothesized scenario for carrier localization in a nanocrystal would be to create a nanocrystal with an ordered core center, a random alloy middle shell, and an ordered outer shell. The ordered outer shell is added to ensure that the electron and holes remain confined to the core and middle shell region. A way for creating this designer nanoparticle is discussed below.

Typically, ternary semiconductor alloy nanocrystals are created by adding, at the start of the synthesis, appropriate ratios of cations (e.g., CdZnSe) or anions (CdSeTe) into the synthesis reaction mixture (R. Bailey et al., JACS 125, 7100 (2003)). This procedure would normally result in an alloy homogenously distributed throughout the nanocrystal volume. Taking the example of the CdZnSe system, in order to form a random alloy middle shell, a more appropriate scheme would be to initially create a CdSe core, shell it with ZnSe, and then perform an appropriate anneal. As is well known in the art, the diffusion profile would be such that the maximum Zn concentration in the nanocrystal would occur at the surface, while in the core center the Zn content would be much lower (CdZnSe, but with a high Cd/Zn ratio). Given the weakening Zn penetration into the center of the nanocrystal, the surface region of the annealed nanoparticle would show the strongest random alloy attributes, with the core region behaving mainly as crystalline CdSe. As such, e-h pairs present in the core CdSe-like region would not only get localized by the increasing energy gap of the CdZnSe surface region, but also by carrier localization generated by the band of random alloy surrounding the core region of the nanocrystal. As stated above an extra outer shell of wide bandgap material, such as, ZnSeS or ZnS, could be added to the annealed nanostructure in order to ensure carrier confinement to the core and middle shell (containing the CdZnSe random alloy) regions.

A more general description of the present invention is ternary semiconductor nanocrystals 100 that have a gradient in the alloy composition from the surface of the ternary nanocrystal to the center of the ternary nanocrystal. In a ternary center region 145 of the ternary semiconductor nanocrystal 100, the degree of alloying can be low such that the semiconductor material is largely binary in composition. Between the ternary center 145 and a ternary surface 135 regions there is an alloy composition transition region where the alloy composition changes from its ternary center composition (mainly binary) to its ternary surface composition (ternary random alloy). To enable greater confinement of the electrons and holes, a semiconductor shell 110 (or multiple shells) can be added to the ternary semiconductor nanocrystals 100 (with a gradient in alloy composition) resulting in the formation of ternary core/shell nanocrystals 120. The ternary semiconductor nanocrystal (either core, core/shell, or core with multiple shells) can be a nanodot, a nanorod, a nanowire, a nano-tetrapod, or any other higher dimensional nanoscale particle that shows quantum confinement effects. With regard to material content, the ternary semiconductor nanocrystal 100 can include II-VI, III-V, or IV-VI semiconductive materials; some examples of ternary semiconductive materials are CdZnSe, CdZnS, InGaAs, and PbSeS, respectively. The semiconductor shell(s) 110 material of the ternary core/shell nanocrystals 120 can be composed of II-VI, III-V, or IV-VI semiconductive materials; however, it is preferred that the semiconductor shell 110 material be II-VI semiconductive material since, to date, successful nanocrystal shelling has only been performed with II-VI materials. The (multiple) semiconductor shell 110 material can either be a binary, ternary, or quaternary compound, for example, ZnSe, CdS, ZnS, ZnSeS, or CdZnSeS. Attached to the surfaces of the ternary core/shell nanocrystals 120 are organic ligands 115, which aid in the nanocrystal growth process and help to stabilize the nanocrystals in the resulting colloids. Specific methods for creating these ternary core/shell nanocrystals 120, along with data showing their single molecule non-blinking (on times greater than a few hours) and short radiative lifetime (4-5 ns) characteristics, will be given below in the examples section. In summary, ternary core/shell nanocrystals 120 are formed, wherein the ternary semiconductor cores contain a gradient in alloy composition, resulting in single molecule non-blinking behavior characterized by on times greater than one minute or radiative lifetimes less than 10 ns.

As discussed above with reference to the CdZnSe ternary semiconductor nanocrystal 100, the diffusion profile of Zn (from the ZnSe shell) would be such that the maximum Zn concentration in the nanocrystal would occur in the ternary surface region 135, while in the ternary center region 145 the Zn content would be much lower (CdZnSe, but with a high Cd/Zn ratio). As will be discussed in the example section below, an unexpected consequence of this profile (for the CdZnSe system) is that the underlying lattice structure changes from wurtzite in the ternary center region 145 to cubic (or zincblende) in the ternary surface region 135. Between the ternary center region 145 and ternary surface region 135, there is a lattice transition region where the lattice evolves from wurtzite to zincblende. One can account for this lattice structure evolution by noting that in the ternary center region 145 where the CdZnSe has a high Cd/Zn ratio, the lattice structure should reflect that of CdSe nanocrystals at room temperature, namely wurtzite. Correspondingly, in the ternary surface region 135, where the Cd/Zn ratio in CdZnSe is smaller than 1 (and possibly much smaller than 1), the lattice structure should reflect that of ZnSe nanocrystals at room temperature, namely zincblende. The physical consequence of the lattice structure change from ternary center region 145 to ternary surface region 135 is that it enhances the localization of the charge carriers to the ternary center region 145. Phenomenologically the added localization can be understood based on the following. Placing an electron in the wurtzite ternary center region 145, as it propagates outward in the core and begins to cross into the zincblende ternary surface region 135, the electron wave would scatter due to the change in the lattice structure (as stated above, even a small 15% random variation in lattice position causes Anderson localization). It should be noted that this extra confinement due to a change in lattice structure will only occur if the two binary components of the ternary alloy have different room temperature lattice structures. For the common II-VI binary compounds, CdSe and CdS form wurtzite nanocrystals, while CdTe, ZnS, ZnSe, and ZnTe form zincblende nanocrystals. Accordingly as examples, the ternary CdZnS would show a lattice change, while ZnSeTe would not. For the case of annealing CdTe/CdS core/shell nanocrystals, interdiffusion on the anion sublattice would be hypothesized to lead to a zincblende lattice in the ternary center region 145 and a wurtzite lattice in the ternary surface region 135.

Combining all of the above, confinement of the carriers in the ternary center region 145 of the invented ternary nanocrystal is hypothesized to occur as a result of three phenomena brought on by the diffusion profile: 1). The energy gap of the ternary surface region 135 is larger than that of the ternary center region 145 (typical cause of confinement); 2) Anderson localization due to more significant random alloy formation in the ternary surface region 135 compared to that in the ternary center region 145; and 3) Scattering localization due to a difference in lattice structure between the ternary center region 145 (for example, wurtzite) and the ternary surface region 135 (for example, zincblende).

Figure 2:
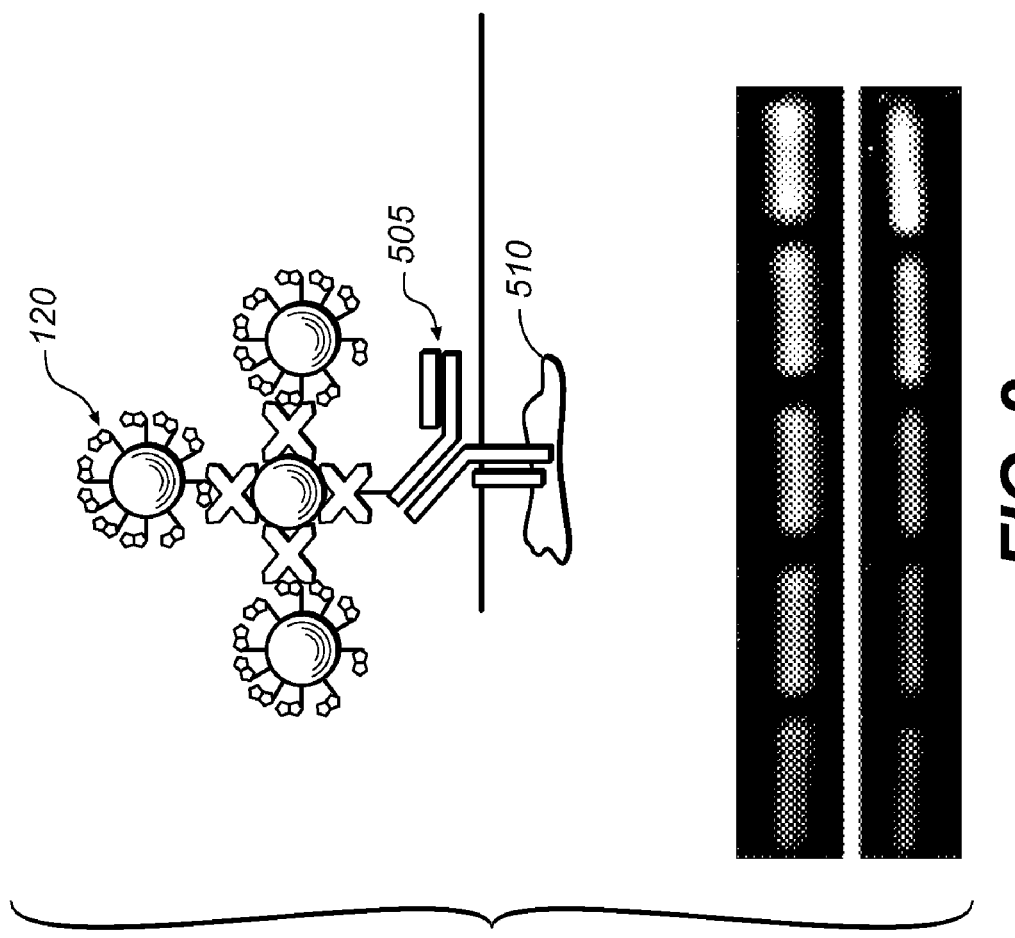
FIG. 2 shows examples of biological labels composed of ternary core/shell nanocrystals in accordance with the present invention.

The present invention further refers to a ternary core/shell quantum dot (or nanocrystal), as disclosed here, conjugated to a molecule having binding affinity for a given analyte. By conjugation to a molecule having binding affinity for a given analyte, a marker compound or probe is formed in which the nanocrystal of the invention serves as a label or tag which emits radiation, preferably in the visible or near infrared range of the electromagnetic spectrum, that can be used for the detection of a given analyte. FIG. 2 gives an illustration of quantum dots being used to tag a protein. In the figure, a analyte 510 is a protein, a binding partner 505 is an antibody, and the fluorescent tags are non-blinking ternary core/shell quantum dots 120. For this invention, the excitation radiation can be UV, visible, or infrared light; whereas, the radiation emitted by the invented ternary core/shell nanocrystals 120 can also be UV, visible, or infrared light but of a longer corresponding wavelength. The invention further includes a medium containing a given analyte; a marker composed of a molecule conjugated to the invented ternary core/shell nanocrystals 120 and having binding affinity for the given analyte; a light source for illuminating the marker with radiation that causes the emission of light from the conjugated ternary core/shell nanocrystal; and a detection apparatus for analyzing the emitted radiation in order to determine the presence of the analyte.

In principle every analyte can be detected for which a specific binding partner exists that is able to at least somewhat specifically bind to the analyte. The analyte can be a chemical compound such as a drug (e.g. Aspirin® or Ribavirin), or a biochemical molecule such as a protein (for example troponin) or a nucleic acid molecule. When coupled to an appropriate molecule with binding affinity (which is also referred to as the analyte binding partner) for an analyte of interest, such as Ribavirin, the resulting probe can be used for example in a fluorescent immunoassay for monitoring the level of the drug in the plasma of a patient. In case of troponin, which is a marker protein for damage of the heart muscle, and thus in general for a heart attack, a conjugate containing an anti-troponin antibody and an inventive nanocrystal can be used in the diagnosis of a heart attack.

The analyte can also be a complex biological structure including but not limited to a virus particle, a chromosome or a whole cell. For example, if the analyte binding partner is a lipid that attaches to a cell membrane, a conjugate including a nanocrystal of the invention linked to such a lipid can be used for detection and visualization of a whole cell. For purposes, such as, cell staining or cell imaging, a nanocrystal emitting visible light is preferably used. In accordance with this disclosure the analyte that is to be detected by use of a marker compound, that includes a nanoparticle of the invention conjugated to an analyte binding partner, is preferably a biomolecule.

Therefore, in a further preferred embodiment, the molecule having binding affinity for the analyte is a protein, a peptide, a compound having features of an immunogenic hapten, a nucleic acid, a carbohydrate or an organic molecule. The protein employed as analyte binding partner can be, for example, an antibody, an antibody fragment, a ligand, avidin, streptavidin or an enzyme. Examples of organic molecules are compounds, such as, biotin, digoxigenin, serotronin, folate derivatives and the like. A nucleic acid can be selected from, but not limited to, a DNA, RNA or PNA molecule, a short oligonucleotide with 10 to 50 bp as well as longer nucleic acids.

When used for the detection of biomolecules a ternary-core/shell nanocrystal of the invention can be conjugated to the molecule having binding activity for an analyte via a linking agent. A linking agent as used herein, means any compound that is capable of linking a ternary-core/shell nanocrystal of the invention to a molecule having such binding affinity. Examples of the types of linking agents which may be used to conjugate a nanocrystal to the analyte binding partner are (bifunctional) linking agents such as ethyl-3-dimethylaminocarbodiimide or other suitable cross-linking compounds which are known to persons skilled in the art. Examples of suitable linking agents are N-(3-aminopropyl)-3-mercapto-benzamide, 3-aminopropyl-trimethoxysilane, 3-mercaptopropyl-trimethoxysilane, 3-(trimethoxysilyl)propylmaleimide, and 3-(trimethoxysilyl)propyl-hydrazide. Prior to reaction with the linking agent, the surface of the nanocrystals can be modified, for example, by treatment with glacial mercaptoacetic acid, in order to generate free mercaptoacetic groups which can then be employed for covalently coupling with an analyte binding partner via linking agents The markers formed in which the nanocrystal of the invention serves as a label or tag, in accordance with the embodiments, can have applications in a wide variety of fields. Many of the markers are intended for use in the fields of biology and medicine. For example, by conjugation to antibodies, the markers described herein can be used routinely for the detection of proteins in cells (immunocytochemistry) and tissues (immunohistochemistry), for nucleic acid detection by fluorescent in-situ hybridization (FISH) and for detecting bacteria and viruses. They also provide a reliable tool for the visualization and mapping of mRNA, DNA expression patterns in various specimens, and for antibody- and antigen-based array studies and detection of antigen-antibody interactions. Furthermore, these markers can also enable detection of trace amounts of toxins in food and other consumer end products.

The ternary core/shell quantum dot (or nanocrystal)-based markers as described herein can be applied in both in vitro and in vivo analysis. For example, they may be used as noninvasive measures in vivo to identify cancer signatures, monitor drug delivery, evaluate drug-induced effects in tumors, and monitor the spatial and temporal distribution of cancer drugs within tumors that may allow for more effective and precise dosing.

Different signal enhancing approaches are applicable to the markers as described herein. For example, the surfaces of the markers can be engineered such that multiple markers are accumulated on one target analyte, resulting in an increase in the intensity of fluorescence. Another example is the indirect immunoassay technique, where the analyte is targeted by a primary antibody, while the bound primary antibody is visualized by a secondary antibody. The signal detection techniques include, but are not limited to, one- and two-photon steady-state and time resolved fluorescence.

In one preferred embodiment, the nanocrystal is incorporated into a plastic bead or a latex bead. Furthermore, a detection kit containing the inventive nanocrystals as defined here is also part of the invention.

In addition to the above described biomedical applications as fluorescent probes, the ternary-core/shell quantum dots of the present invention can also be used in light-emitting devices and quantum information (computing and cryptography) devices. For light emitting device applications, emission from the ternary-core/shell quantum dots can occur as a result of direct electron-hole recombination on the dots, Forster energy transfer from neighboring emissive species (both organic and inorganic), and optically pumping from a variety of light sources, such as, inorganic LEDs, organic LEDs, lasers, and compact fluorescent lamps. Forster energy transfer mediated light emission from quantum dots embedded in LED devices has been discussed for both OLEDs (Coe et al., Nature 420, 800 (2002)) and LEDs (Achermann et el., Nano Lett 6, 1396 (2006)). Both types of LED devices will be enhanced as a result of employing the ternary-core/shell quantum dots of the present invention. More specifically, it is desirable that radiative recombination occurs as soon as the exciton has been transferred (via Forster energy transfer) to the quantum dot in order to prevent unwanted nonradiative recombination from occurring. Since the ternary core/shell quantum dots have short radiative lifetimes, nonradiative recombination will be reduced, resulting in LED devices with overall higher internal quantum efficiencies.

Another application for incorporating emissive quantum dots in light emitting devices is to employ them as emissive phosphors that are optically pumped by a higher energy (the wavelength of the pump source is shorter than the average emission wavelength) light source. Inventive optically pumped devices of the present invention contain at least one layer having the ternary core/shell nanocrystals and a light source for exciting the nanocrystals, which causes the ternary core/shell nanocrystals to emit light. The light source can be an LED (either organic or inorganic), a laser, a compact fluorescent lamp, or any other incoherent light source that is well known in the art. The phosphors, or ternary core/shell nanocrystals, can be used to produce white light, convert higher energy light into a specific visible wavelength band (for example, produce green light), or any other desired wavelength conversion (emit ultraviolet, blue, cyan, green, yellow, magenta, red, or infrared radiation, or a combination thereof) as is well known in the art. As discussed above, there are many advantages to replacing conventional phosphors by quantum dot phosphors; however, their usage in product is hampered by their poor temperature performance and low quantum efficiency in dense quantum dot phosphor films. Since, as discussed above, the later deficiency can be remedied by employing emissive quantum dots with short radiative lifetimes, using the ternary core/shell quantum dots of the present invention as phosphors will enable enhanced quantum efficiencies as a result of their short radiative lifetimes.

The final category of light emitting devices incorporating quantum dots are those for which emission occurs as a result of direct recombination of electron and holes inside of the dots. Again, the internal quantum efficiency (IQE) of the LED or laser will be enhanced as a result of incorporating the ternary core/shell quantum dots of the present invention (with short radiative lifetimes) as the emissive quantum dots in the device. As is well known in the optoelectronic device art, short radiative lifetimes following electron-hole injection result in enhanced device IQE, thus explaining the enhanced IQE of laser and microcavity LED devices.

Figure 3:
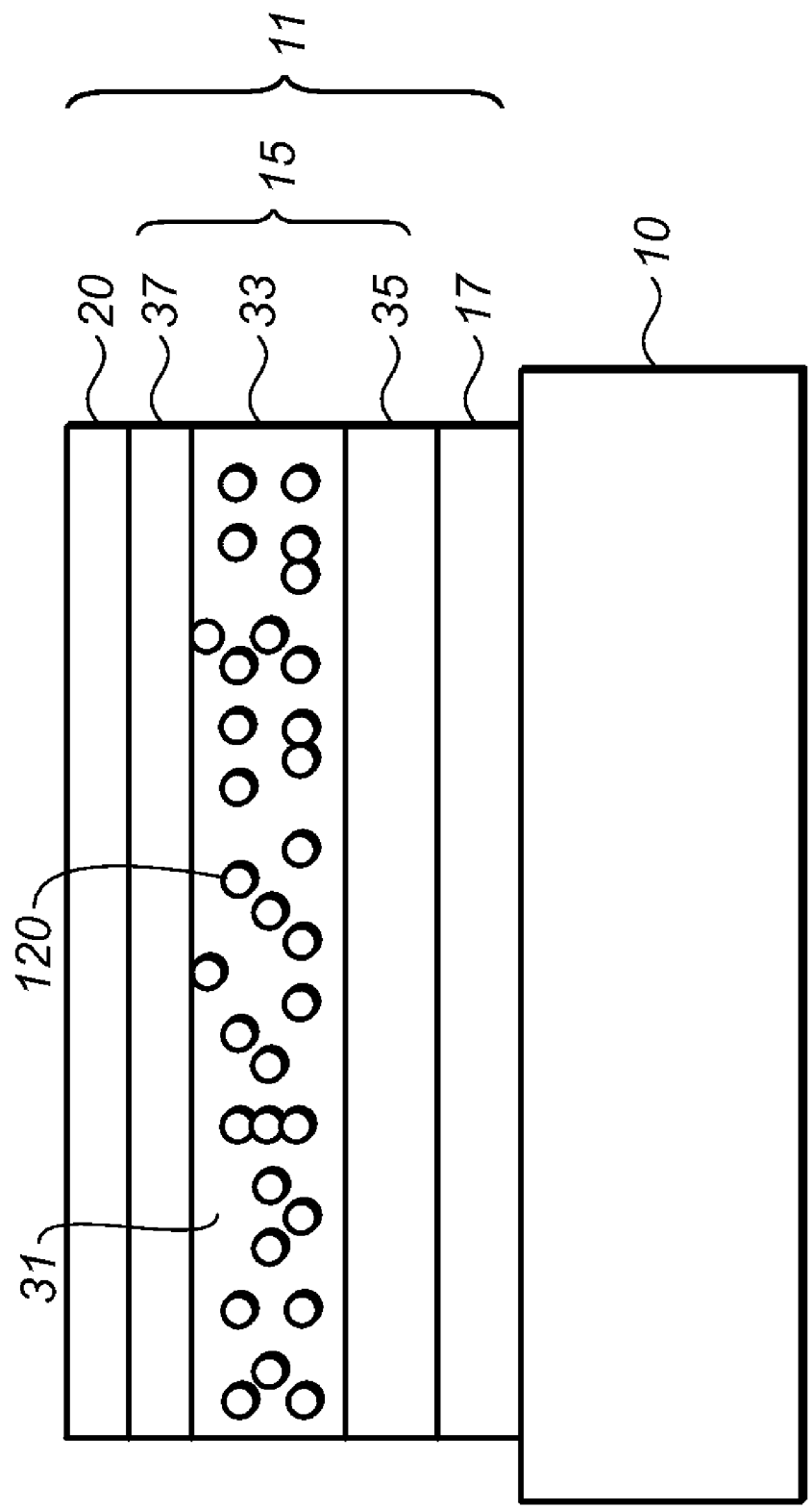
FIG. 3 shows a side-view schematic of a light emitting device in accordance with the present invention.

In the illustration in FIG. 3, a typical LED 11 structure is shown to aide in the understanding electroluminescent device embodiments of the current invention. LED 11 contains an electroluminescent (EL) unit 15 between a first electrode 17 and a second electrode 20. The EL unit 15 as illustrated contains all layers between the first electrode 17 and the second electrode 20, but not the electrodes. A light-emitting layer 33 includes light-emitting ternary-core/shell nanocrystals 120 in a semiconductor matrix 31. Semiconductor matrix 31 can be an organic host material in the case of hybrid LED devices, or an inorganic semiconductor matrix that is either crystalline or polycrystalline in the case of inorganic quantum dot LEDs. The light-emitting layer 33 can be considered to contain an ensemble of quantum dots, referring to the fact that there are multiple quantum dots in the emitter layer 33 that emit light. Since the radiative lifetime is short for each of these QDs, the overall efficiency of LEDs using an ensemble of these quantum dots will be improved over traditional quantum dots. Although the light-emitting layer 33 is illustrated as having the light-emitting ternary core/shell nanocrystals 120 well dispersed within the semiconductor matrix 31, this is for illustration purposes only and should not be considered limiting. The ternary core/shell nanocrystals 120 can also be in a single layer, or monolayer. EL unit 15 can optionally contain p-type or n-type charge transport layers 35 and 37, respectively, in order to improve charge injection. EL unit 15 can have additional charge transport layers, or contact layers (not shown). One typical LED device uses a glass substrate, a transparent conducting anode such as indium-tin-oxide (ITO), an EL unit 15 containing a stack of layers, and a reflective cathode layer. The layers in the EL unit 15 can be organic, inorganic, or a combination thereof. Light generated from the device is emitted through a glass substrate 10. This is commonly referred to as a bottom-emitting device. Alternatively, a device can include a non-transparent substrate, a reflective anode, a stack of layers (organic, inorganic, or a combination thereof), and a top transparent cathode layer. Light generated from the device is emitted through the top transparent electrode. This is commonly referred to as a top-emitting device.

LEDs employing quantum dots prepared by colloidal methods do not have the constraints of LEDs using dots grown by high vacuum deposition techniques (S. Nakamura et al., Electron. Lett. 34, 2435 (1998)), namely the substrate does not need to be lattice matched to the LED semiconductor system. For example, the substrate could be glass, plastic, metal foil, or Si. Additionally colloidal quantum dots can be combined with a number of different semiconductor matrix materials, including organics. Forming quantum dot LEDs using these colloidal techniques is highly desirably, especially if low cost deposition techniques are used to deposit the LED layers.

As is well known in the art, two low cost ways for forming quantum dot films include depositing a colloidal dispersion of ternary core/shell nanocrystals 120 by drop casting or spin casting. Common solvents for drop casting quantum dots are a 9:1 mixture of hexane:octane (C. B. Murray et al., Annu. Rev. Mater. Sci. 30, 545 (2000)). The organic ligands 115 need to be chosen such that the quantum dot particles are soluble in hexane. As such, organic ligands with hydrocarbon-based tails are good choices, such as, the alkylamines. Using well-known procedures in the art, the ligands coming from the growth procedure (TOPO, for example) can be exchanged for the organic ligand 115 of choice (C. B. Murray et al., Annu. Rev. Mater. Sci. 30, 545 (2000)). When spin casting a colloidal dispersion of quantum dots, the requirements of the solvent are that it easily spreads on the deposition surface and the solvents evaporate at a moderate rate during the spinning process. It was found that alcohol-based solvents are a good choice; for example, combining a low boiling point alcohol, such as, ethanol, with higher boiling point alcohols, such as, a butanol-hexanol mixture, results in good film formation. Correspondingly, ligand exchange can be used to attach an organic ligand (to the quantum dots) whose tail is soluble in polar solvents; pyridine is an example of a suitable ligand. The quantum dot films resulting from these two deposition processes are luminescent, but non-conductive. The films are resistive since non-conductive organic ligands separate the ternary core/shell nanocrystals 120. The films are also resistive since as mobile charges propagate along the quantum dots, the mobile charges get trapped in the core regions due to the confining potential barrier of the semiconductor shell 110.

Figure 4:
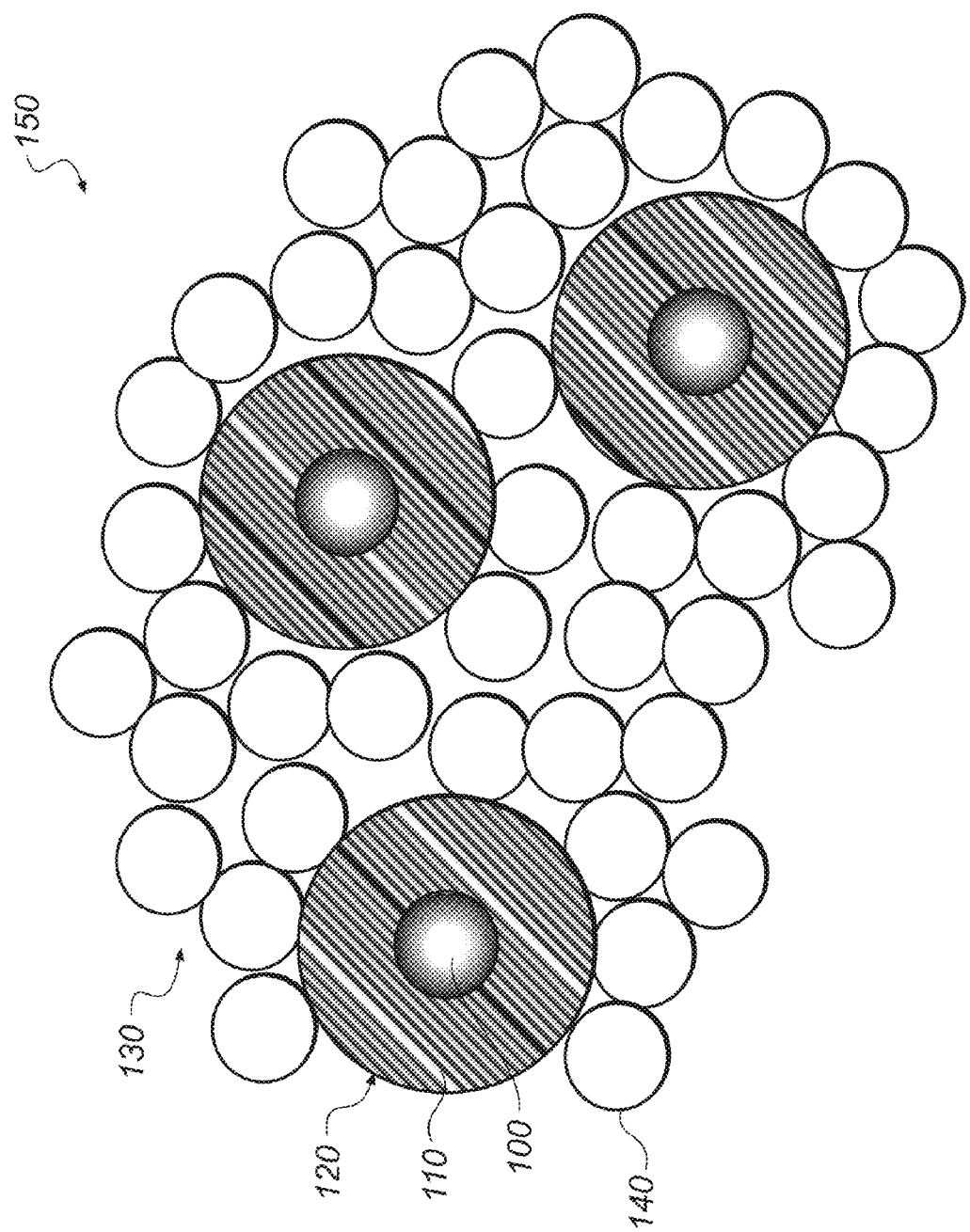
FIG. 4 shows a schematic of a section of an inorganic light emitting layer in accordance with the present invention.

FIG. 4 schematically illustrates a way of providing an inorganic light-emitting layer 150 that is simultaneously luminescent and conductive. The concept is based on co-depositing small (<2 nm), conductive inorganic nanoparticles 140 along with the ternary-core/shell nanocrystals 120 to form an inorganic light emitting layer 150. A subsequent inert gas (Ar or $N_2$) anneal step is used to sinter the smaller inorganic nanoparticles 140 amongst themselves and onto the surface of the larger ternary-core/shell nanocrystals 120. Sintering the inorganic nanoparticles 140 results in the creation of a continuous, conductive polycrystalline semiconductor matrix 130. Through the sintering process this matrix is also connected to the ternary core/shell nanocrystals 120 and forms a polycrystalline inorganic light emitting layer. Therefore, the polycrystalline inorganic light emitting layer is an annealed film of a colloidal dispersion of ternary core/shell nanocrystals and semiconductor matrix nanoparticles. As such, a conductive path is created from the edges of the inorganic light emitting layer 150, through the semiconductor matrix 130 and to each ternary-core/shell nanocrystal 120, where electrons and holes recombine in a light emitting ternary semiconductor nanocrystals 100. It should also be noted that encasing the ternary-core/shell nanocrystals 120 in the conductive semiconductor matrix 130 has the added benefit that it protects the quantum dots environmentally from the effects of both oxygen and moisture Preferably, the inorganic nanoparticles 140 are composed of conductive semiconductive material, such as, type IV (Si), III-V (GaP), or II-VI (ZnS or ZnSe) semiconductors. In order to easily inject charge into the ternary-core/shell nanocrystals 120, it is preferred that the inorganic nanoparticles 140 be composed of a semiconductor material with a band gap comparable to that of the semiconductor shell 110 material, more specifically a band gap within 0.2 eV of the shell material's band gap. For the case that ZnS is the outer shell of the ternary-core/shell nanocrystals 120, then the inorganic nanoparticles 140 are composed of ZnS or ZnSSe with a low Se content. The inorganic nanoparticles 140 are made by chemical methods well known in the art. Typical synthetic routes are decomposition of molecular precursors at high temperatures in coordinating solvents, solvothermal methods (O. Masala and R. Seshadri, Annu. Rev. Mater. Res. 34, 41 (2004)) and arrested precipitation (R. Rossetti et al., J. Chem. Phys. 80, 4464 (1984)). As is well known in the art, nanometer-sized nanoparticles melt at much reduced temperatures relative to their bulk counterparts (A. N. Goldstein et al., Science 256, 1425 (1992)). Correspondingly, it is desirable that the inorganic nanoparticles 140 have diameters less than 2 nm in order to enhance the sintering process, with a preferred size of 1-1.5 nm. With respect to the larger ternary-core/shell nanocrystals 120 with ZnS shells, it has been reported that 2.8 nm ZnS particles are relatively stable for anneal temperatures up to 350° C. (S. B. Qadri et al., Phys. Rev B60, 9191 (1999)). Combining these two results, the anneal process has a preferred temperature between 250 and 350° C. and a duration up to 60 minutes, which sinters the smaller inorganic nanoparticles 140 amongst themselves and onto the surface of the larger ternary core/shell nanocrystals 120, whereas the larger ternary-core/shell nanocrystals 120 remain relatively stable in shape and size. It should be noted that the inorganic nanoparticles 140 can be either nanodots, nanorods, nanowires, or any other higher dimensional nanoparticle, such that, in one dimension the length scale of the nanoparticle is less than 2 nm and, as a result, enables the sintering of the nanoparticles during the 250-350° C. anneal process.

Figure 5:
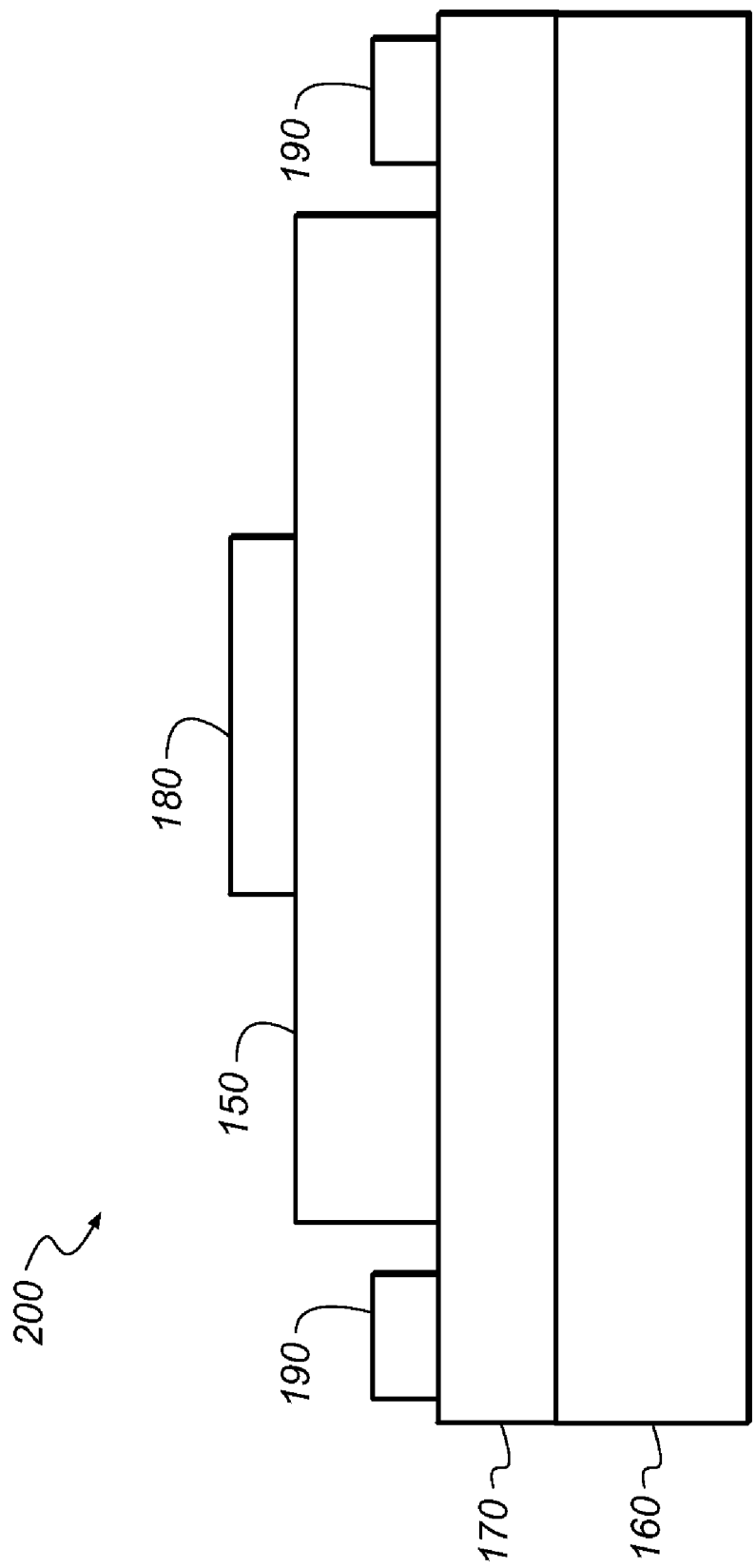
FIG. 5 shows a side-view schematic of another embodiment of a light emitting device in accordance with the present invention.

FIG. 5 gives one example of an inorganic electroluminescent LED device 200 that incorporates the light emitting layer 150 containing ternary-core/shell nanocrystals 120. A substrate 160 supports the deposited semiconductor and metal layers; its only requirements are that it is sufficiently rigid to enable the deposition processes and that it can withstand the thermal annealing processes (maximum temperatures of ~325° C.). It can be transparent or opaque. Possible substrate materials are glass, silicon, metal foils, and some plastics. The next deposited material is an anode 170. For the case where the substrate 160 is p-type Si, an anode 170 needs to be deposited on the bottom surface of the substrate 160. A suitable anode metal for p-Si is Al. It can be deposited by thermal evaporation or sputtering. Following its deposition, it is annealed at ~430° C. for 20 minutes. For all of the other substrate types named above, the anode 170 is deposited on the top surface of the substrate 160 (as shown in FIG. 5) and includes a transparent conductor, such as, indium tin oxide (ITO). The ITO can be deposited by sputtering or other well-known procedures in the art. The ITO is typically annealed at ~300° C. for 1 hour to improve its transparency. Because the sheet resistance of transparent conductors, such as, ITO, are much greater than that of metals, a bus metal 190 can be selectively deposited through a shadow mask using thermal evaporation or sputtering to lower the voltage drop from the contact pads to the actual device. Next is deposited the inorganic light emitting layer 150. As discussed above it can be drop or spin casted onto the transparent conductor (or Si substrate). Other deposition techniques, such as, inkjetting the colloidal quantum dot-inorganic nanoparticle mixture is also possible. Following the deposition, the inorganic light emitting layer 150 is annealed at a preferred temperature of 250-300° C. for 15-45 minutes. Lastly, a cathode 180 metal is deposited over the inorganic light emitting layer 150. Candidate cathode 180 metals are ones that form an ohmic contact with the material forming the inorganic nanoparticles 140. For example, for the case of ZnS inorganic nanoparticles 140, a preferred metal is Al. It can be deposited by thermal evaporation or sputtering, followed by a thermal anneal at 285° C. for 10 minutes. Those skilled in the art can also infer that the layer composition can be inverted, such that, the cathode 180 is deposited on the substrate 160 and the anode 170 is formed on the inorganic light emitting layer 150. For the case of Si supports, the substrate 160 is then n-type Si.

Additionally, substrate 160 can be rigid or flexible and can be processed as separate individual pieces, such as sheets or wafers, or as a continuous roll. Typical substrate materials include glass, plastic, metal, ceramic, semiconductor, metal oxide, semiconductor oxide, semiconductor nitride, or combinations thereof. Substrate 160 can be a homogeneous mixture of materials, a composite of materials, or multiple layers of materials. The substrate 160 can either be light transmissive or opaque, depending on the intended direction of light emission.

A light transmissive substrate 160 is desirable for viewing the light emission through the substrate 160. Transparent glass or plastic are commonly employed in such cases. Using FIG. 5 as a reference, a bottom emitting inorganic light emitting device can be formed on the substrate 160 that is transparent. The first electrode (either anode 170 or cathode 180) is deposited over the substrate 160 and is transparent. The polycrystalline inorganic light emitting layer 150 is then formed over the transparent first electrode, and a second electrode (either cathode 180 or anode 170), which is reflective, is formed over the inorganic light emitting layer 150.

For applications where the light emission is viewed through the top electrode, the transmissive characteristic of the bottom support is immaterial, and therefore can be light transmissive, light absorbing or light reflective. Substrates for use in this case include, but are not limited to, glass, plastic, semiconductor materials, ceramics, and circuit board materials. Again using FIG. 5 as a reference, a top emitting device can be formed using any substrate 160. A reflective first electrode is then deposited over the substrate 160, the inorganic light emitting layer 150 is formed over the first electrode, and a transparent second electrode is formed over the inorganic light emitting layer 150. Additionally, it is possible to have viewable emission from both sides of the display, by using a transparent substrate 160 and forming both electrodes from transparent materials.

Figure 6:
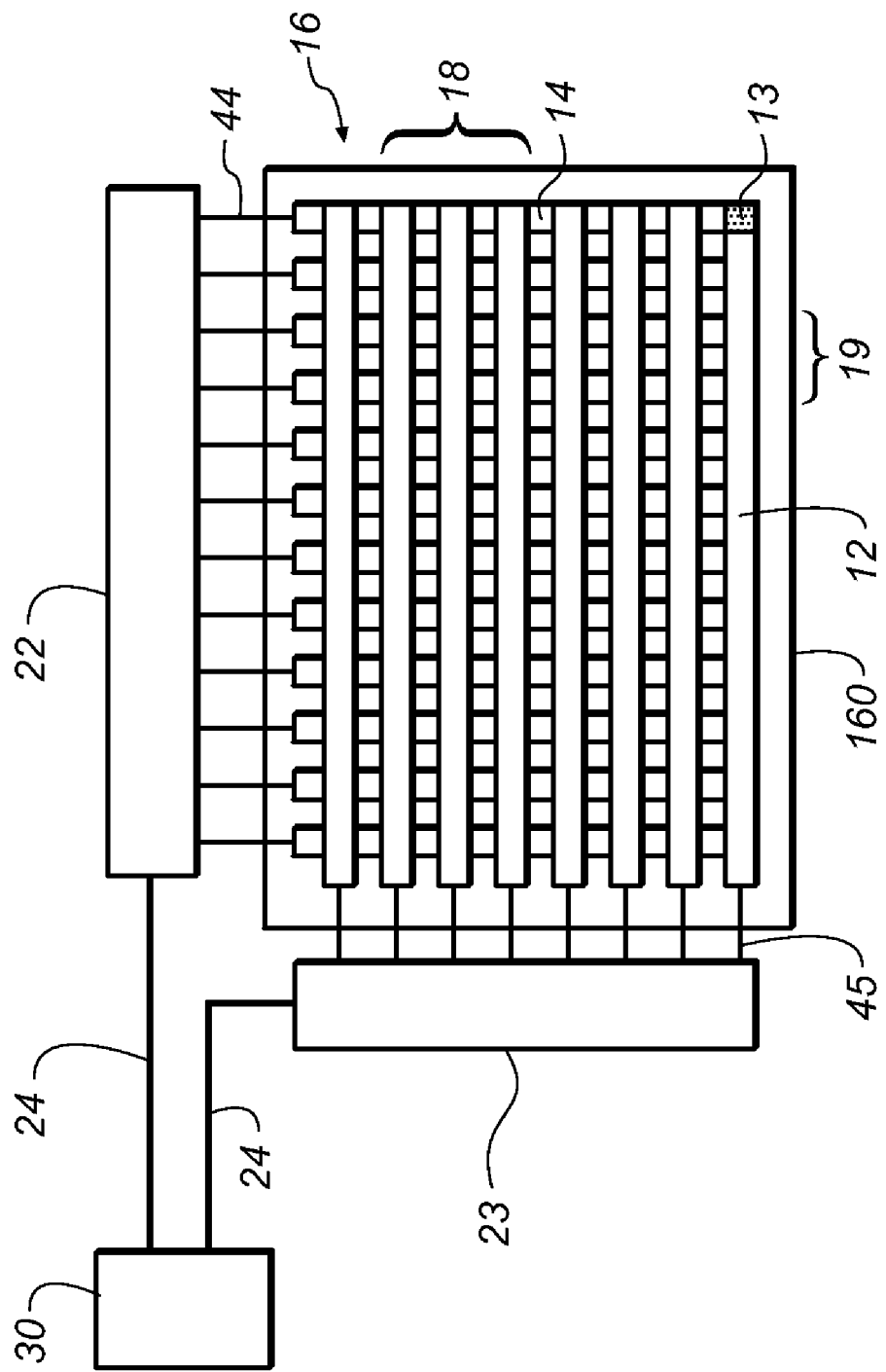
FIG. 6 shows an example of a passive matrix electroluminescent (EL) device in accordance with the present invention.

Both top emitting and bottom emitting devices can be either passive-matrix or active-matrix devices, and as such can be considered to be electronic displays. The term "electronic display" refers to a display wherein electronic entities control the intensity of the different areas of the display. In order for a device to have independently controllable, separate light emitting areas, at least one of the electrodes must be patterned. Whence, an inventive passive or active matrix light emitting device includes a plurality of independently controlled light emitting elements, wherein at least one light emitting element includes: a first patterned electrode; a second electrode opposed to the first electrode; and a polycrystalline inorganic light emitting layer, including ternary core/shell nanocrystals within a semiconductor matrix, formed between the electrodes. The patterned electrodes can be controlled by either thin film electronic components, or by a driver circuit(s) formed externally to the substrate. FIG. 6 illustrates an example of an off-panel driver and a series of horizontal and vertical electrodes in a passive-matrix display. Alternatively, substrate 160 can be an active-matrix substrate with low-temperature polysilicon or amorphous-silicon thin film transistors (TFTs). Electronic components on substrate 160 are not limited to transistors. Substrate 160 can contain other active electronic components such as thin film electronic components that are composed of crystalline, polycrystalline or amorphous semiconductor materials. Such thin film electronic components include, but are not limited to: TFTs, capacitors, diodes, switches and resistors.

One example of a passive matrix device is illustrated in FIG. 6. An inorganic light emitting display device according to the present invention includes a substrate 160. Row electrodes 12 and column electrodes 14 formed on one side of the substrate 160 define row 18 and column 19 of passive matrix pixel elements 13 where the row and column electrodes overlap. The row and column electrodes 12 and 14 provide data and selection signals to an array 16 of passive matrix pixel elements 13. The row electrodes 12 and column electrodes 14 are connected to electrical contacts 44 and 45 respectively. Discrete data drivers 22 and selection drivers 23 are located around the periphery of the array 16 and are electrically connected to the electrical contacts 44 and 45. The discrete data and selection drivers 22 and 23 are conventional integrated circuits formed on separate, discrete substrates (such as silicon). They can be separate from the substrate 160 as shown, or attached onto the same side of the substrate 160 as row and column electrodes 12 and 14. The discrete data drivers 22 and selection drivers 23 drive the pixel elements 13 using a passive matrix control scheme and respond to address and data control signals provided by a display controller 30 through address, data, and control lines 24. The data values can be written into the data drivers 22 using conventional memory writing techniques using the address, data and control lines 24.

Referring again to FIG. 6, the passive matrix pixel elements 13 contain active layers that emit light in response to an electric signal. As such, inorganic electroluminescent media 410 (FIG. 8) is placed between the electrodes 12 and 14; the inorganic electroluminescent media 410 includes the inorganic light emitting layer 150. Additionally, inorganic electroluminescent media 410 may include inorganic charge transport layers. When a light-emitting element is energized through one column 19 and one row 18, the element at the column and row intersection is energized and light is emitted. Light can be viewed either through the substrate or from the top depending on the materials used to construct the passive matrix device.

Figure 7:
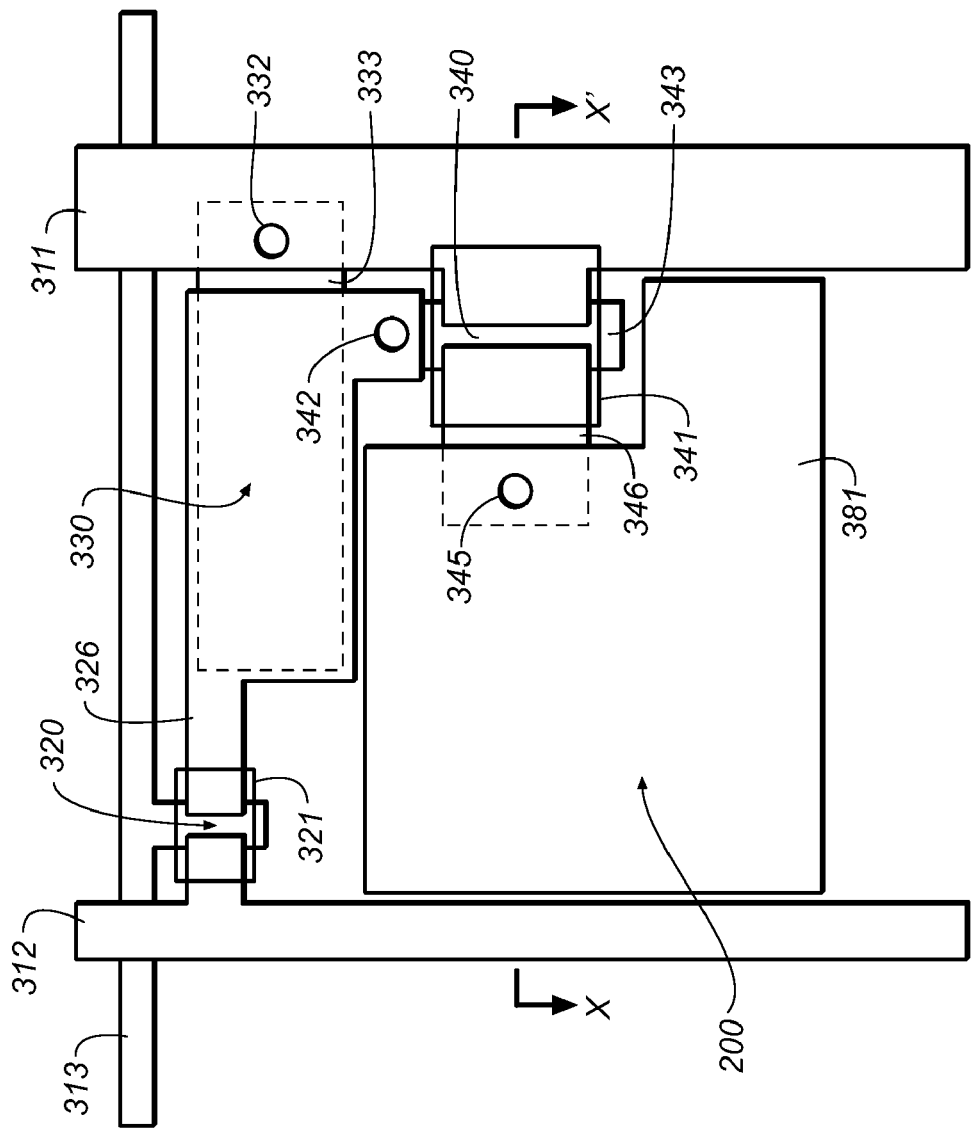
FIG. 7 shows a pixel layout of a bottom emitting electroluminescent device in accordance with the present invention.

There are many potential pixel designs for a bottom emitting active matrix device. A physical layout view of one design for inorganic light emitting device 200 using amorphous silicon type TFTs is shown in FIG. 7. The construction of the various circuit components such as a select transistor 320, a storage capacitor 330, and a power transistor 340 can be seen in FIG. 7. The drive circuitry components are fabricated using conventional integrated circuit and thin film transistor fabrication technologies. A select line 313 is formed in a first conductor layer. A power line 311 and a data line 312 are formed in a second conductor layer. An insulator is formed there in order to electrically isolate these two conductor layers. This configuration permits the data lines and power lines to cross without electrically connecting thereby forming the matrix of pixels. Electrical connections between features formed in the different conductor layers are achieved by forming contact holes, also referred to as vias, through the insulator layers disposed between the conductor layers. The term electrical connection is used in this disclosure to indicate a connection that enables the flow of electrical current. This can be a direct physical connection of two conductive elements. An electrical connection can have electrical resistance. An electrical connection can also be indirectly provided through other circuit components such as transistors or diodes.

A portion of the select line 313 extends to form the gate of select transistor 320. Over this first conductor layer is a first insulator layer (not shown), which is also referred to as the gate insulator layer. Select transistor 320 is formed from a first semiconductor region 321 using techniques well known in the art. The first terminal, which can be either the source or drain terminal, is formed from a portion of data line 312. A second terminal of select transistor 320, a terminal 326, extends to form the second capacitor electrode of storage capacitor 330 and also to electrically connect to a power transistor gate electrode 343 of power transistor 340 through a contact hole 342. The transistors, such as select transistor 320, are shown as bottom gate type transistors, however, other types such as top gate and dual-gate transistors are also known in the art and can be employed. Similarly, power transistor 340 is formed in a second semiconductor region 341. The first semiconductor region 321 and second semiconductor region 341 are typically formed in the same semiconductor layer over the gate insulator layer. The semiconductor layer is composed of multiple sub-layers such as an intrinsic, or undoped, sub-layer and a doped sub-layer. This semiconductor layer here is amorphous silicon but can also be polycrystalline or crystalline or known semiconductor materials other than silicon, such as organic semiconductors and metal oxide semiconductors. The power transistor gate electrode 343 of power transistor 340 is formed in the first conductor layer. The first terminal of power transistor 340 is formed from a portion of power line 311, as shown. A second terminal 346 of power transistor 340 is formed in the second conductor layer. Storage capacitor 330 is formed between a first capacitor electrode 333 formed in the first conductor layer and the second capacitor electrode formed as a portion of terminal 326 as described above. The gate insulator layer (not shown) is deposited between the first capacitor electrode and the second capacitor electrode. The first capacitor electrode 333 is electrically connected to power line 311 through a contact hole 332. Alternate configurations are known in the art where the storage capacitor is not directly connected to the power line but is instead provided a separate capacitor line, which can be maintained at a different voltage level or the same voltage level relative to the power line.

A lower electrode 381 of the inorganic light emitting device is formed from a third conductor layer formed over the first and second conductor layers. A second insulator layer (not shown) is located between the lower electrode 381 and the second conductor layer. The lower electrode 381 of the inorganic light emitting device is connected to power transistor 340 through a contact hole 345 formed in this second insulator layer.

Lower electrode 381 serves to provide electrical contact to the inorganic electroluminescent media (not shown) of the inorganic light emitting diode. Over the perimeter edges of the lower electrode 381, an inter-pixel insulator layer (not shown) can also be formed to cover the edges of the electrodes and reduce shorting defects as is known in the art. Examples of such inter-pixel insulator layers can be found in U.S. Pat. No. 6,246,179.

Figure 8:
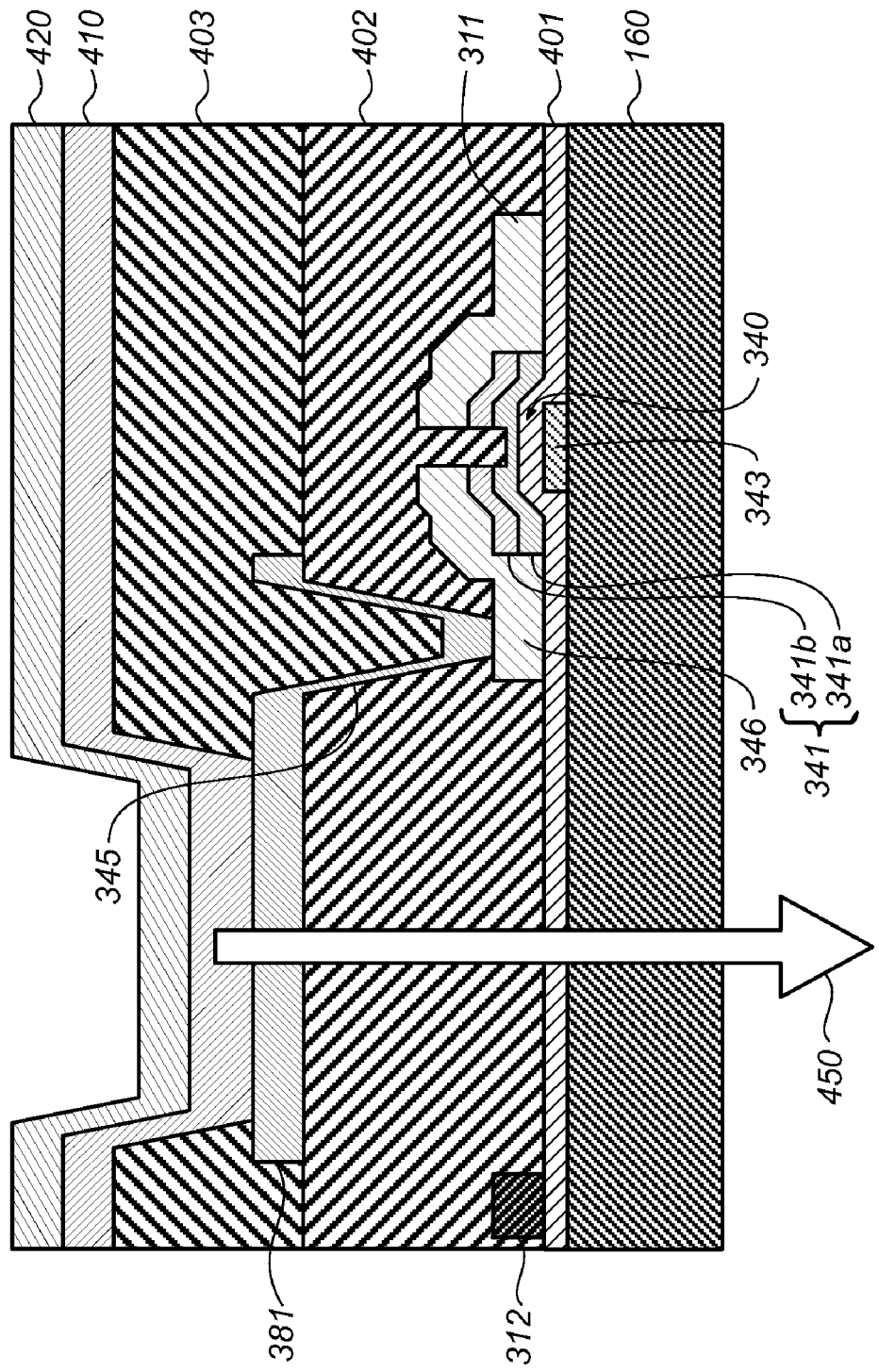
FIG. 8 shows a cross section of a bottom emitting electroluminescent device in accordance with the present invention.

A cross-sectional illustration of the device of FIG. 7 along line X-X' is shown in FIG. 8. In this cross-sectional view the position of the insulating substrate 160 as well as the positions of a first insulator layer 401 (also referred to as the gate insulator layer) and a second insulator layer 402 can be seen. These insulator layers are shown as single layers but can actually include several sub-layers of different insulating materials. The construction of the amorphous silicon power transistor 340 is shown. The second semiconductor region 341 is shown with an intrinsic sub-layer 341a and a doped sub-layer 341b.

Figure 9:
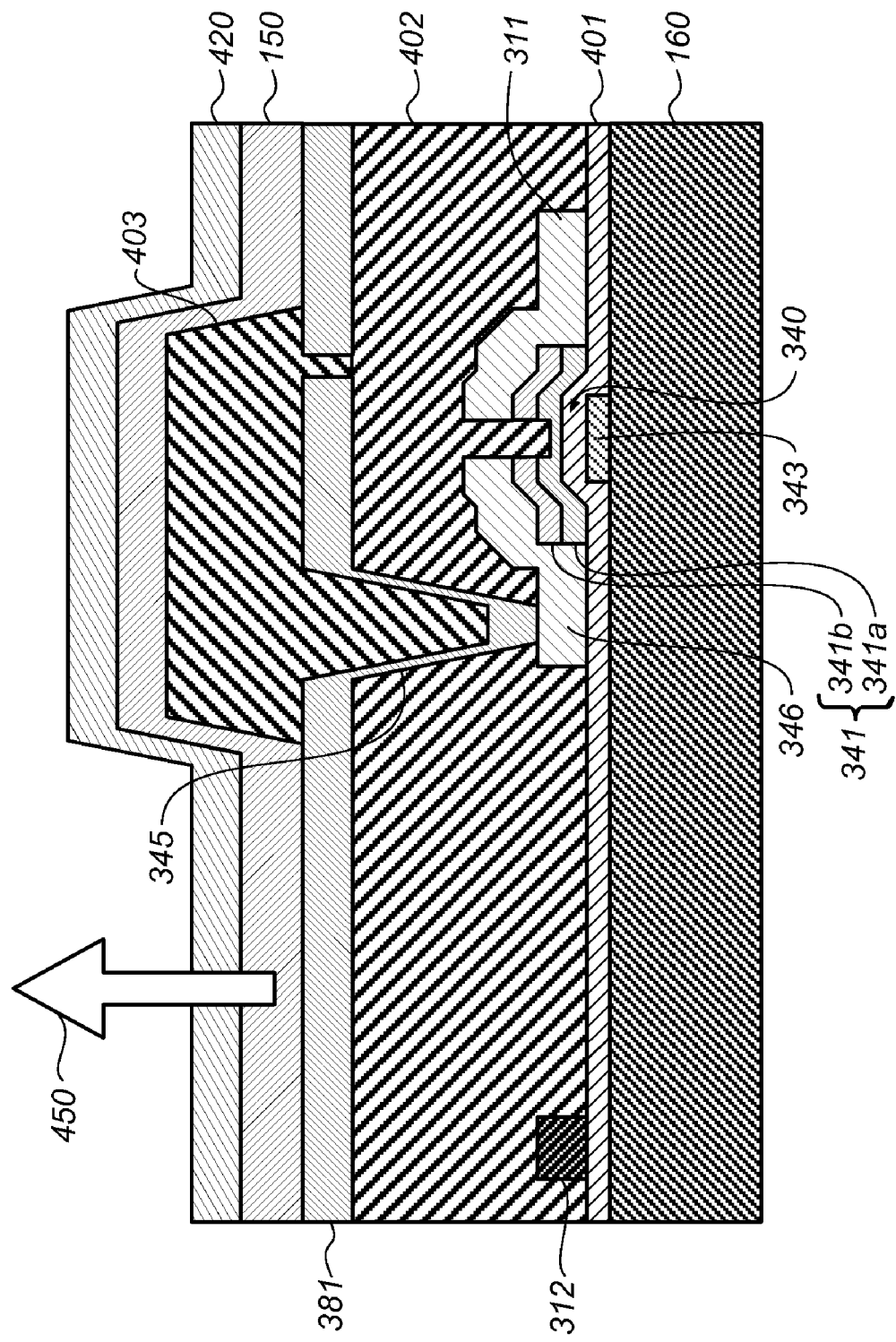
FIG. 9 shows a cross section of a top emitting electroluminescent device in accordance with the present invention.

The placement of an inter-pixel insulator 403 over the edges of lower electrode 381 is shown. Over lower electrode 381, the inorganic electroluminescent media 410 is formed. The inorganic electroluminescent media 410 includes all of the layers between the anode and cathode. In FIG. 8, the inorganic electroluminescent media 410 is shown as a single layer, but it is typically composed of a plurality of sub-layers such as a polycrystalline inorganic light-emitting layer and one or more inorganic charge transport layers. Above the inorganic electroluminescent media 410, an upper electrode 420 is formed. Upper electrode 420 is typically common in such active matrix arrangements and serves to provide an electrical connection to the second voltage level. The lower electrode 381 and upper electrode 420 serve as spaced apart electrodes which provide electrical current to the inorganic electroluminescent media 410 disposed between the electrodes. When electrically stimulated, the inorganic electroluminescent media 410 above the lower electrode 381 in the area defined by the opening of the inter-pixel insulator 403 will emit light 450. Light 450 is shown as exiting the bottom of the device (through the substrate 160). This configuration is known as a bottom-emitting configuration. This requires that lower electrode 381 be at least partially transparent. As such, lower electrode 381 is commonly constructed of materials such as indium tin oxide (ITO), indium zinc oxide (IZO), or thin (less than 25 nm) layers of metal such as aluminum or silver, or combinations, thereof. The upper electrode 381 is typically reflective in such a configuration, being constructed at least in part of a reflective metals such as aluminum, aluminum alloys, silver or silver alloys. The opposite configuration is known in the art where light exits through the upper electrode, the direction opposite of the substrate. This opposite configuration is known as a top emitter configuration. In this configuration, the light transmissive and reflective properties of the upper and lower electrodes respectively are reversed from that of the bottom emitter configuration. The cross-sectional view in FIG. 9 illustrates a top emitter configuration consistent with the present invention. FIG. 9 can be understood within the context of the description of FIG. 8. Although not shown, it should be understood by one skilled in the art that additional pixel layout arrangements are applicable to the current invention, both for amorphous silicon and low temperature poly-silicon transistors.

The ternary-core/shell quantum dots of this invention can be used to form monochrome, multi-color or full-color displays. The term "multi-color" describes a display panel that is capable of emitting light of a different hue in different areas. In particular, it is employed to describe a display panel that is capable of displaying images of different colors. These areas are not necessarily contiguous. The term "full color" is commonly employed to describe multi-color display panels that are capable of emitting in at least the red, green, and blue regions of the visible spectrum and displaying images in any combination of hues. The complete set of colors that can be generated by a given display is commonly called the color gamut of the display. The red, green, and blue colors constitute the three primary colors from which all other colors can be generated by appropriate mixing. However, the use of additional colors to extend the color gamut is possible. Additionally, there are practical applications for displays that emit outside of the visible range. Therefore, the ternary-core/shell quantum dots of each light emitting element or device can be selected to have an emission wavelength that suites the application. These wavelengths can be ultraviolet, blue, cyan, green, yellow, magenta, red, or infrared in characteristic, or any combination thereof.

The term "pixel" is employed in its art-recognized usage to designate an area of a display panel that can be stimulated to emit light independently of other areas. The terms "light emitting element" and "independently controlled light emitting element," for the purposes of this discussion is synonymous with pixel. It is also noted that no physical size requirements should be inferred from either term: pixel or light emitting element. A device may consist of a single large light-emitting element, millions of small light-emitting elements, or any practical configuration in between. It is recognized that in full-color systems, several pixels of different colors will be used together to generate a broad range of colors, and a viewer can term such a group as a single pixel.

For the purposes of this disclosure, such a group will be considered several different light-emitting elements or pixels.

Inorganic light emitting devices of this invention can have broadband emission. Broadband emission is light that has significant components in multiple portions of the visible spectrum, for example, blue and green. Broadband emission can also include light being emitted in the red, green, and blue portions of the spectrum in order to produce white light. White light is that light that is perceived by a user as having a white color, or light that has an emission spectrum sufficient to be used in combination with color filters to produce a practical full color display. The term "white light-emitting" as used herein refers to a device that produces white light internally, even though part of such light can be removed by color filters before viewing. Accordingly, white light-emitting inorganic light emitting devices of this invention can be used for lighting applications as solid-state light sources, for example, as lamps. In display applications, such a white light-emitting inorganic light-emitting device can be used as a display backlight for a light-gating device that modulates the light to form an image. One practical example of this would be a display backlight in a liquid crystal display (LCD).

Electroluminescent applications such as displays and lighting use the ensemble properties of the quantum dots in the device. There are also electroluminescent applications that only utilize the properties of a single quantum dot. For example single molecule LEDs (or lasers) can be either single quantum dots embedded within an etched mesoscopic heterojunction (J. Vuckovic et al., Appl. Phys. Lett. 82, 3596 (2003)), or can be fabricated so that all of the active layers of the LED (or lasers) are contained within a single nanocrystal (R. Agarwal and C. M. Lieber, Appl. Phys. A: Mater. Sci. Proc. 85, 209-215 (2006)). The ability to generate single photons (using single photon LEDs) at a well-defined timing or clock is crucial for practical implementation of quantum key distribution (N. Gisin et al., Rev. Mod. Phys. 74, 145 (2002)), as well as for quantum computation (E. Knill et al., Nature 409, 46 (2001)) and networking based on photon qubits (quantum bits). Three different criteria are taken into account when evaluating the quality of a single photon source: high efficiency, small multiphoton probability (measured by the second order coherence function, $g^{(2)}(0)$), and quantum indistinguishability. For some quantum cryptography implementations, such as, the BB84 protocol (N. Gisin et al., Rev. Mod. Phys. 74, 145 (2002), high efficiency and small $g^{(2)}(0)$ are required, but quantum indistinguishability is not necessary. On the other hand, for almost all other applications in quantum information systems, such as, linear optics quantum computation, LOQC (E. Knill et al., Nature 409, 46 (2001)), the photons need to undergo multiphoton interference, and as a result, quantum indistinguishability is required.

Single photon LEDs have been constructed that are optically pumped (C. Santori et al., Nature 419, 594 (2002)) by lasers and electrically pumped (Z. Yuan et al., Science 295, 102 (2002)), where in the majority of cases the emissive species has been self-assembled quantum dots. The typical way for improving the efficiency of the devices is to place the quantum dots within a microcavity configuration, where the best results are obtained for confinement in all three dimensions. As a result of the confinement, the IQE of the device is improved (due to the Purcell effect) and the collection efficiency is greatly enhanced (due to the large reduction in the number of available output modes). Associated with the improvement in the IQE is the large reduction in the quantum dot radiative lifetime (about a factor of 5), down to around 100-200 ps. This reduction in radiative lifetime also results in improvements in the quantum indistinguishability (A. J. Shields, Nature Photon. 1, 215 (2007)). Consequently, a key to both high efficiency and quantum indistinguishability is a short radiative lifetime. As such, since the ternary-core/shell quantum dots of the present invention have greatly reduced radiative lifetimes compared to typical colloidal quantum dots, it is an advantage to use them in single photon LED devices, either optically or electrically pumped. Another useful aspect of the invented ternary-core/shell quantum dots is their lack of blinking. Naturally, the usefulness of a single photon LED source is greatly reduced if it turns off due to unwanted blinking behavior. With regard to electrically pumped single photon LEDs, a preferred optoelectronic device of the present invention has two spaced apart electrodes with a single ternary core/shell nanocrystal 120 disposed between the two spaced apart electrodes. As is well known in the art, the electrically pumped single photon LED containing a single ternary core/shell nanocrystal 120 can also include n- and p-transport layers, conductive organic or inorganic matrix material surrounding the single nanocrystal, distributed bragg reflectors, and other well known enhancements in order to improve the IQE and collection efficiency of the device. For optically pumped single photon LEDs, a preferred embodiment is an optical cavity containing at least one layer including a single ternary core/shell nanocrystal 120 in an appropriate matrix and a light source for optically exciting the ternary core/shell nanocrystal 120 so as to cause the emission of UV, visible, or infrared light. The matrix material can be inorganic, organic, or combinations thereof. It is preferred that the light source is a laser. As is well known in the art, the optically pumped single photon LED containing a single ternary core/shell nanocrystal 120 can also include dielectric mirrors, photonic lattices, spacer layers, and other well known enhancements in order to improve the IQE and collection efficiency of the device. In sum, both the non-blinking and short radiative lifetime properties of the invented ternary-core/shell quantum dots lead to their adventitious use in single photon LED devices (either optically or electrically pumped) for quantum cryptography and quantum computing applications.

The following examples are presented as further understandings of the present invention and are not to be construed as limitations thereon.

Inventive Example I-1

Preparation of the Inventive Ternary Core/Shell Non-Blinking Nanocrystals, $Cd_xZn_{1-x}Se/ZnSe$ All synthetic routes were carried out using standard airless procedures with a dry box and a Schlenk line. The first step in creating the ternary cores was to form CdSe cores. Typically, 0.0755 g of TDPA (1-tetradecylphosphonic acid), 4 g of pre-degassed TOPO (trioctylphosphine oxide), and 2.5 g of HDA (hexadecylamine) were added in a three-neck flask. The mixture was degassed at 100° C. for half an hour. The stock solution of 1 M TOPSe was prepared by dissolving of 0.01 mol selenium in 10 ml TOP (trioctylphosphine). 1 ml of TOPSe was added to the flask and the mixture was heated to 300° C. The cadmium stock solution (0.06 g of $CdAc_2$ in 3 ml TOP) was quickly injected under vigorous stirring resulting in nucleation of CdSe nanocrystals, after which time the temperature was set at 260° C. for further growth. After 5-10 min, the heating was removed and the flask was allowed to cool to room temperature.

2.5 ml of the as-prepared crude CdSe cores was reheated to 300° C. in half an hour. In a drybox, two solutions were prepared. One consisted of 0.14 ml of 1 M $ZnEt_2$ (in hexane)

and 0.56 ml of TOP; the other consisted of 0.14 ml of 1 M TOPSe (in TOP) and 0.56 ml of additional TOP. Both solutions were loaded into a 1 ml syringe respectively. As soon as the temperature of the core crude solution reached 300° C., 0.35 ml of the $ZnEt_2$ solution was injected from the syringe into the heated solution, followed by the injection of 0.35 ml TOPSe solution in 20 seconds. The above procedure was repeated at time intervals of 20 seconds till the contents of both syringes were emptied. After the addition, the reaction mixture was heated for 5 more minutes, and then heat was removed to stop the reaction.

The final step in the process was shelling of the CdZnSe ternary cores. A three-neck reaction flask with as-prepared crude $Cd_xZn_{1-x}Se$ cores was heated to 190° C. The solution of $ZnEt_2$ (1 M, 0.625 ml) and TOPSe (1M, 1.25 ml) in 1 ml TOP was slowly added dropwise under vigorous stirring. After the addition the temperature was lowered to 180° C. and the solution was left to stir for another hour to form annealed $Cd_xZn_{1-x}Se/ZnSe$ nanocrystals.

Inventive Example I-2

Preparation of the Inventive Ternary Core/Shell Non-Blinking Nanocrystals, $Cd_xZn_{1-x}Se/ZnSeS$ All synthetic routes were carried out using standard airless procedures with a dry box and a Schlenk line. The first step in creating the ternary cores was to form CdSe cores. In a three-neck flask, 0.2 mmol of CdO and 0.5 g of stearic acid were heated to 180° C. until the mixture went clear. Inside of a dry box, 3 ml of HDA and 6 ml of TOPO were added to the mixture. On a Schlenk line the mixture was heated to 310° C. under vigorous stirring, whereupon 1 ml of 1 M TOPSe was injected. The temperature was then lowered to 290-300° C. and stirred for an additional 10 minutes.

Next a ZnSe shell was formed on the CdSe cores. After cooling the core crude solution back to room temperature, it was reheated to 190° C. In a syringe was added 260 μl of 1 M diethylzinc in hexane, 260 μl of 1M TOPSe, and 2 ml of TOP. The contents of the syringe were then added to the CdSe core crude solution at a rate of 10 ml/hr. After the addition the mixture temperature was lowered to 180° C., in order to anneal the resulting ternary cores for 45-90 minutes. After the 180° C. anneal, the mixture temperature was taken back to room temperature. A second anneal was then performed for 30 minutes at 300° C. to create the ternary core nanocrystals containing a gradient in the alloy composition.

The final step in the process was shelling of the CdZnSe ternary cores with ZnSeS ($ZnSe_{0.33}S_{0.67}$ in the example below). In a new 3-neck flask was added 1.5 ml of the CdZnSe crude cores, 4 ml of TOPO, and 3 ml of HDA, followed by heating the mixture to 190° C. In a syringe was added 804 μl of 1 M diethylzinc in hexane, 268 μl of 1M TOPSe, 536 μl of 0.25M bis(trimethylsilyl)sulfide in hexane, and 2.5 ml of TOP. The contents of the syringe were then added to the CdZnSe core crude solution at a rate of 10 ml/hr. After the addition the mixture temperature was lowered to 180° C., in order to anneal the resulting ternary cores for 45-90 minutes.

Figure 10:
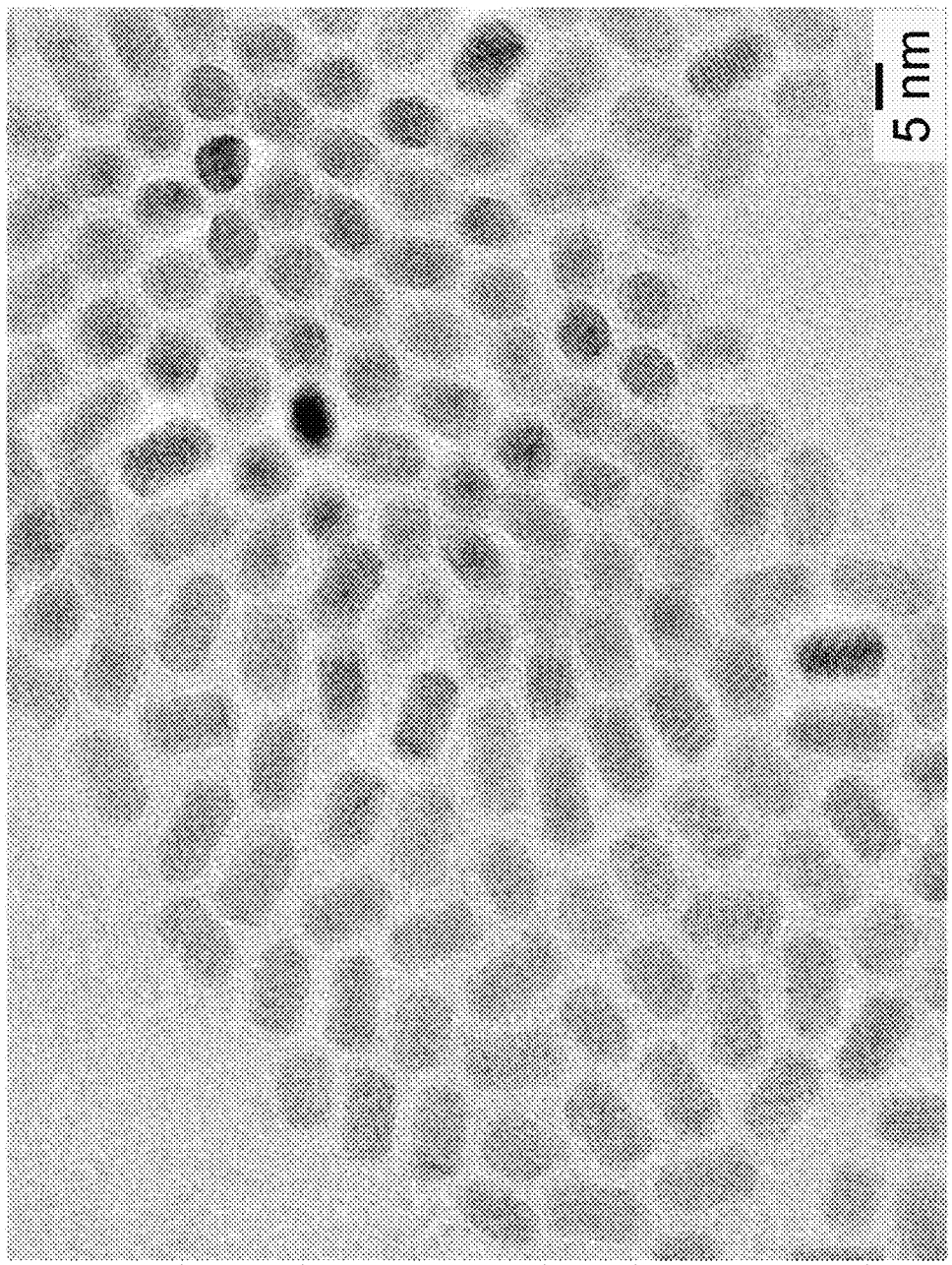
FIG. 10 shows TEM images of ternary core/shell nanocrystals of the present invention.
Figure 11:
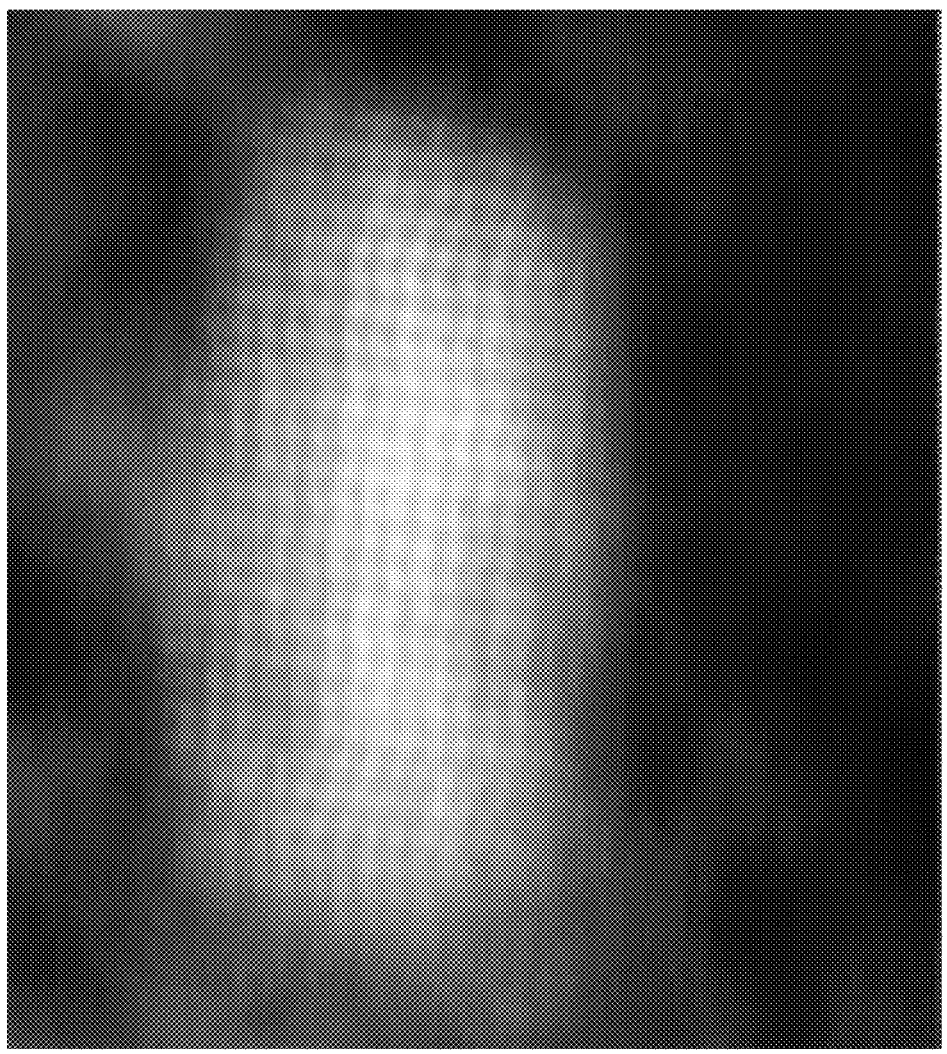
FIG. 11 shows a STEM image of a ternary core/shell nanocrystal of the present invention.

FIG. 10 shows a TEM (transmission electron microscopy) image of the ternary core/shell nanocrystals of this example. It should be noted that the emissive nanocrystals were quantum rods with an aspect ratio of approximately 2.5:1. FIG. 11 shows a STEM (scanning TEM) image of an isolated ternary core/shell nanocrystal of this example. The image was taken at a magnification of 5 million. The nanocrystal was imaged along the (−2 1 0 0) wurtzite axis. The image shows that the nanocrystal has a wurtzite lattice structure in the center of the nanorod (as evidenced by the waviness of the lattice fringes) and at the ends of the nanorod has a cubic (or zincblende) lattice as evidenced by the alignment of the lattice fringes. STEM images showing the lattice transition from wurtzite at the center of the nanocrystal to cubic (zincblende) at the surface of the nanocrystal were also obtained for core ternary nanocrystals (thus without a outer shell) of this example.

Single Molecule Blinking and Anti-Bunching Measurements

Standard single molecule blinking and anti-bunching measurements were performed on the ternary core/shell nanocrystals of examples I-1 and I-2. In addition for comparison, prior art CdTe nanocrystals (80% quantum yield) from Quantum Dot Corporation were also measured. For both single molecule measurements, standard procedures were followed for creating very dilute films of the nanocrystals on quartz coverslips. The optical measurements were made using a Nikon confocal microscope excited by a 532 nm continuous green laser. The laser excitation was focused to a diffraction limited spot of ~400 nm by an oil immersion objective (1.5 NA). The emission from the sample was collected through the same objective, with the 532 nm light rejected by a filter. The emission was then directed into a silicon avalanche photo-diode (SAPD). The fluorescence intensity versus time trace was obtained by feeding the SAPD output into a TTL multi-channel scaler with integration times of 1-30 ms/bin. The laser power density used to excite all of the nanocrystals (both inventive and prior art) was varied from ~0.1-10 kW/cm². The anti-bunching measurements were performed using a Hanbury-Brown and Twiss setup (R. Hanbury et al., Nature 177, 27 (1956)) with a 50/50 beamsplitter and two single-photon counting SAPDs. The two SAPDs were connected to the start and stop inputs of a time-to-amplitude converter, whose output was stored in a time correlated photon counting card.

Figure 12A:
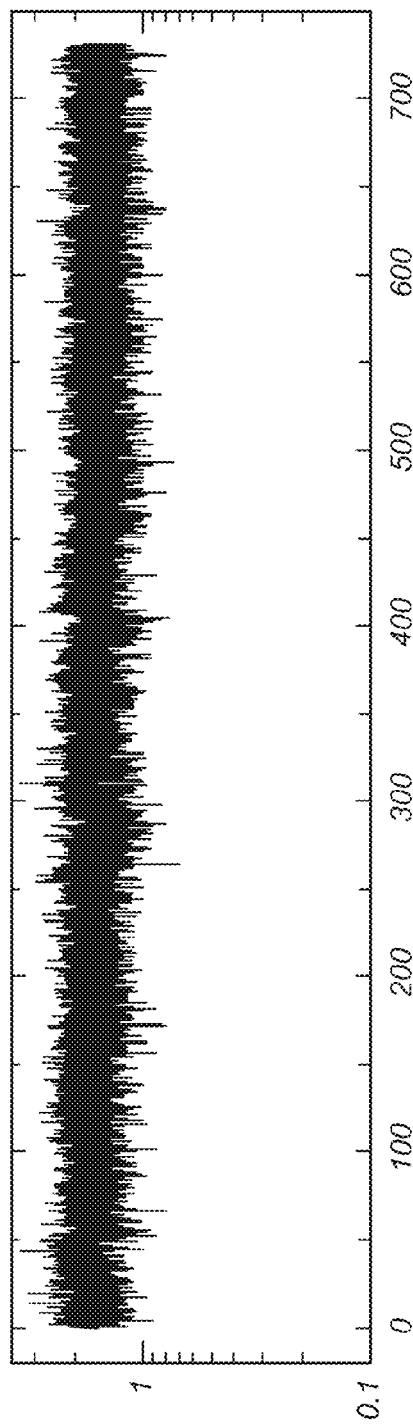
FIGS. 12A and 12B show fluorescence time traces of the ternary core/shell nanocrystals of the present invention.
Figure 12B:
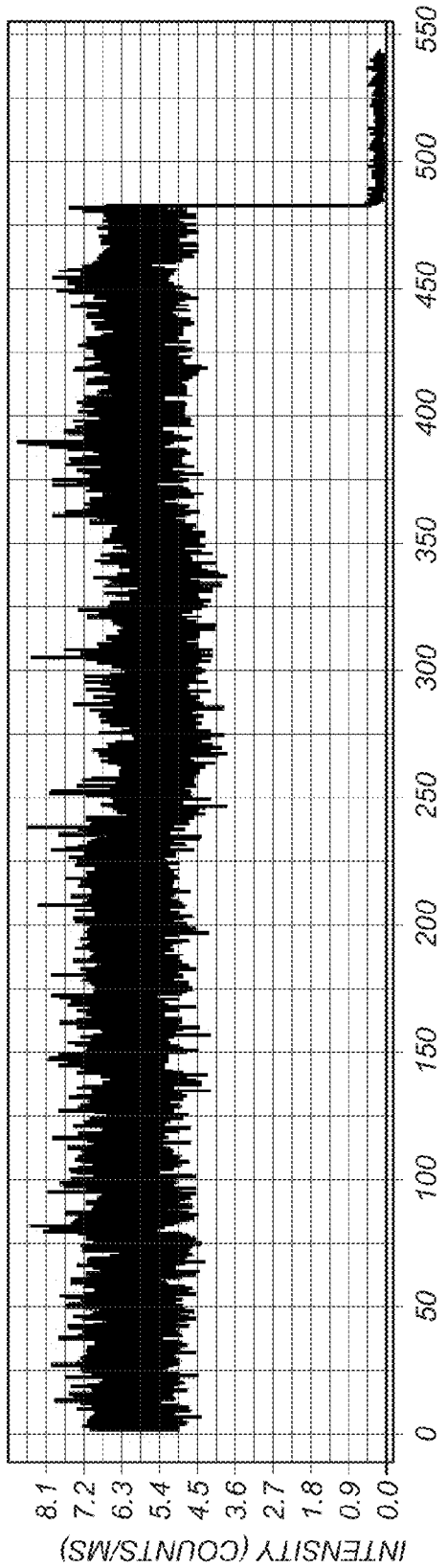

FIGS. 12A and 12B give examples of the fluorescence time traces for the core/shell ternary nanocrystals of example I-1. For the data shown in FIG. 12A the laser power density was ~1 kW/cm² (30 ms time bins), while for the data of FIG. 12B, the laser power density was ~10 kW/cm² (10 ms time bins). As can be seen, the ternary nanocrystals have on-times of ~10 minutes. In fact, the ternary nanocrystals turn off not due to blinking phenomena, but due to being photo-bleached. As a result the ternary nanocrystals with good photostability characteristics had on times up to several hours (for the 1 kW/cm² excitation density). It was also verified that blinking did not occur on a very fast time scale, since similar time traces were obtained for time bins as small as 1 ms. At the higher laser power excitation density of 10 kW/cm², FIG. 12B shows that the ternary dots can have on-times of ~10 minutes (beyond 10 minutes, all of the ternary dots become photo-bleached at the 10 kW/cm² excitation density). The ternary dots from example I-2 also had very long on-times (>10 minutes); in addition they turned off as a result of being photo-bleached.

Figure 13:
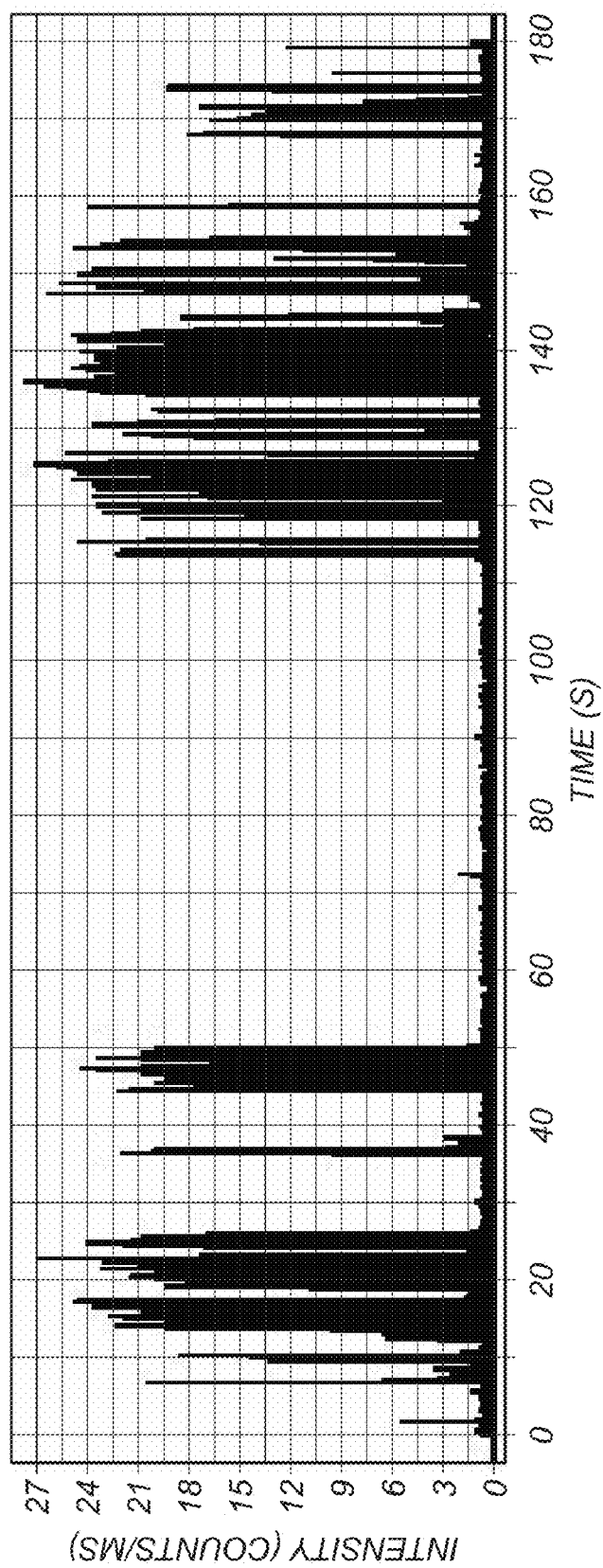
FIG. 13 shows the fluorescence time trace of a conventional nanocrystal representative of the prior art.

For comparison FIG. 13 shows the fluorescence time trace of the prior art CdTe nanocrystals at a laser power excitation density of 10 kW/cm², where the collection times bins were 10 ms. The time trace behavior shown in FIG. 13 is typical of nanocrystals films reported in the literature, where the highest reported on-times are ~1 minute. As such, the inventive ternary core/shell nanocrystals have significantly different single molecule fluorescence intermittency behavior compared to prior art nanocrystals previously reported in the literature.

Figure 14B:
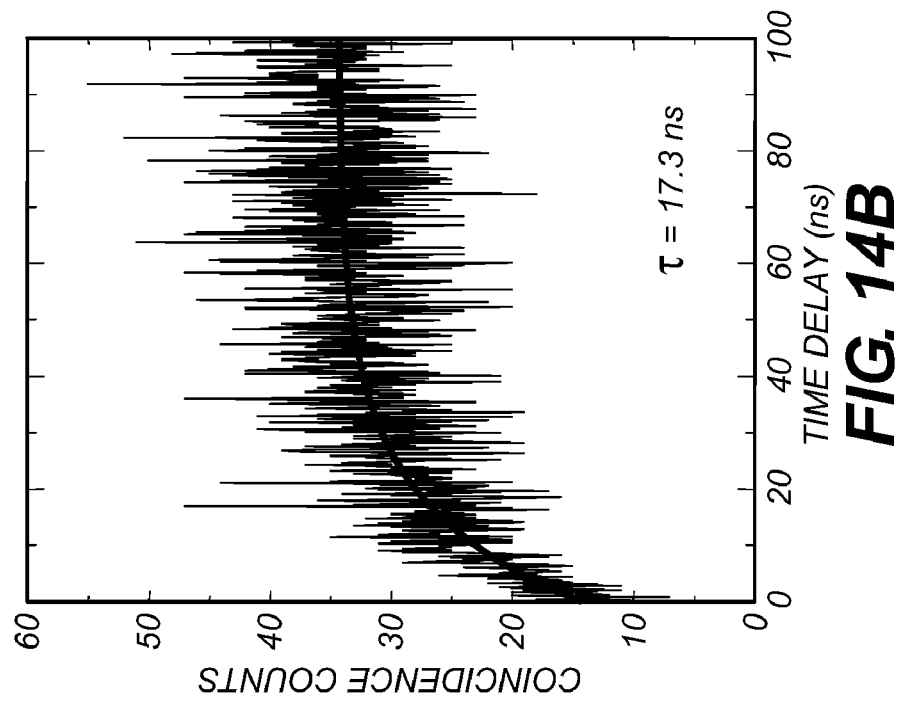
FIGS. 14A and 14B shows the second-order correlation functions, $g^{(2)}(\tau)$, for ternary core/shell nanocrystals of the present invention and for conventional prior art nanocrystals.
Figure 14A:
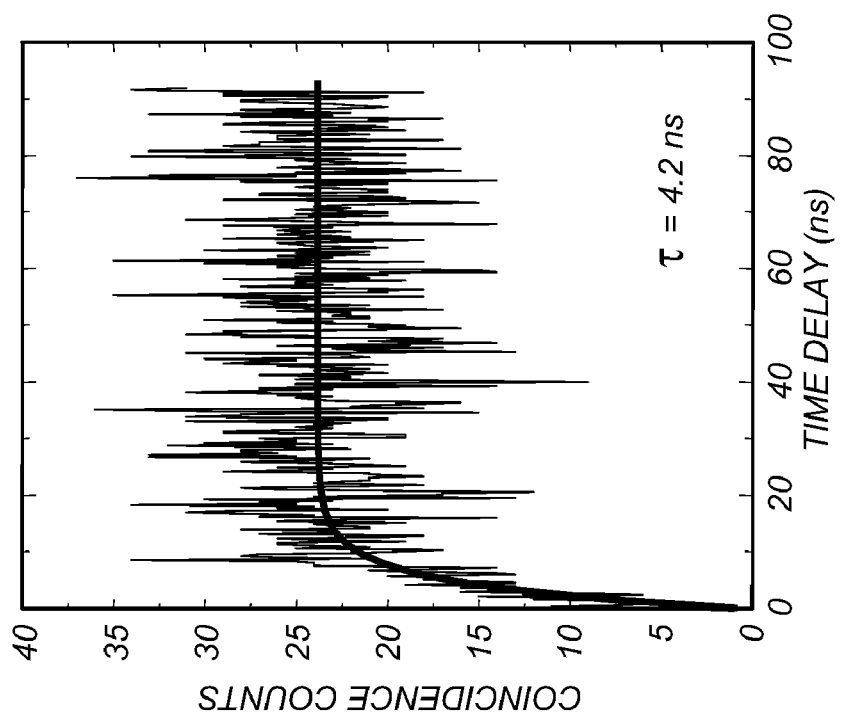

FIGS. 14A and 14B give representative second-order correlation functions, $g^{(2)}(\tau)$ for the core/shell ternary nanocrystals of example I-1 and the prior art CdTe nanocrystals, respectively. The correlation function for the ternary nanocrystals shows unambiguous anti-bunching behavior at τ=0. This is especially important for the inventive nanocrystals since it demonstrates that the non-blinking behavior is due to isolated nanocrystals. As can be seen the radiative lifetime of the core/shell ternary nanocrystals (4-5 ns, on average) was significantly lower than that for the prior art CdTe nanocrystals (20 ns on average). For comparison, radiative lifetimes (derived by anti-bunching measurements) for quantum rods can range from 20-200 ns, while lifetimes for self-assembled quantum dots are in the 1-2 ns range. For the ternary core/shell nanocrystals of example I-2, photo-bleaching issues led to difficulties in extracting a radiative lifetime using anti-bunching measurements.

Quantum Yield Measurements

Absolute quantum yield measurements (using an integrating sphere) were made for dense nanocrystal films composed of the ternary core/shell nanocrystals from examples I-1 and I-2. For the I-1 case, a standard ligand exchange was performed to remove the TOPO, HDA, and TOP ligands and replace them solely with HDA. Concentrated dispersions of the HDA terminated nanocrystals were drop cast out of toluene onto glass slides. The resulting absolute quantum yield was ~75%. In comparison the relative quantum yield of the corresponding dispersion was ~80%. For the I-2 case, a ligand exchange was performed to replace the growth ligands with pyridine. Once more a concentrated dispersion was formed (ethanol solvent) and drop cast onto glass slides. The resulting absolute quantum yields of the films were ~40%, while that for the corresponding dispersion was ~36%. In both cases, there is no degradation (within experimental error) in quantum yield in going from solution measurements to dense film measurements. In comparison, it is well known that typical nanocrystals suffer at least a factor of 2 or 3 drop-off in quantum yield in going from solution to film (Achermann et al., Nano Lett 6, 1396 (2006)).

In summary, the ternary core/shell nanocrystals of examples I-1 and I-2 exhibit no blinking (with on times greater than hours), very short radiative lifetimes (4-5 ns) that are reminiscent of self-assembled quantum dots, and resistance to proximity quenching in dense nanocrystal phosphor films.

The invention has been described in detail with particular reference to certain preferred embodiments thereof, but it will be understood that variations and modifications can be effected within the spirit and scope of the invention.

PARTS LIST 10 substrate
11 LED
12 row electrode
13 pixel element
14 column electrode
15 EL unit
16 array
17 first electrode
18 rows
19 column
20 second electrode
22 data driver
23 selection driver
24 control lines
30 controller
31 semiconductor matrix
33 light-emitting layer
35,37 charge transport layers (optional)
44 electrical contacts
45 electrical contacts
100 ternary semiconductor nanocrystal
110 semiconductor shell
115 organic ligands
120 ternary core/shell nanocrystal
130 semiconductor matrix
135 ternary surface region
140 inorganic nanoparticles
145 ternary center region
150 inorganic light emitting layer
160 substrate
170 anode
180 cathode
190 bus metal
200 inorganic light emitting device
311 power line
312 data line
313 select line
320 select transistor
321 first semiconductor region
326 terminal
330 capacitor
332 contact hole
333 capacitor electrode
340 power transistor
341 second semiconductor region
341a intrinsic sub-layer
341b doped sub-layer
342 contact hole
343 power transistor gate electrode
345 contact hole
346 terminal
381 lower electrode
401 first insulating layer
402 second insulating layer
403 interpixel insulator
410 inorganic electroluminescent media
420 upper electrode
450 light

The invention claimed is:

1. An optoelectronic device comprising:
   (a) two spaced apart electrodes; and
   (b) at least one layer containing ternary core/shell nanocrystals disposed between the spaced electrodes and having ternary semiconductor cores containing a gradient in alloy composition and wherein the ternary core/shell nanocrystals exhibit single molecule non-blinking behavior characterized by on times greater than one minute or radiative lifetimes less than 10 ns.

2. The optoelectronic device of claim 1 wherein the device is a display backlight or a solid-state light source.

3. An inorganic light emitting device including a plurality of independently controlled light emitting elements, wherein at least one light emitting element comprises: a first patterned electrode; a second electrode opposed to the first electrode; and a polycrystalline inorganic light emitting layer comprising ternary core/shell nanocrystals within a semiconductor matrix formed between the electrodes, wherein the ternary core/shell nanocrystals have ternary semiconductor cores containing a gradient in alloy composition and exhibit single molecule non-blinking behavior characterized by on times greater than one minute or radiative lifetimes less than 10 ns.

4. The inorganic light emitting device of claim 3, further including thin film electronic components formed on the substrate or a driver circuit formed externally to the substrate for independently controlling signals applied to the patterned first electrodes.

5. The inorganic light emitting device of claim 4 wherein the thin film electronic components are composed of crystalline, polycrystalline or amorphous semiconductor materials.

6. The inorganic light emitting device of claim 3 wherein the device is a display backlight, multi-color display, full color display, monochrome display or lighting device.

7. The inorganic light emitting device of claim 3 wherein the independently controlled light emitting elements emit light of different colors.

8. The inorganic light emitting device of claim 3, wherein the ternary core/shell nanocrystals of each light emitting element have an emission wavelength selected from an ultraviolet, blue, cyan, green, yellow, magenta, red, or infrared emission wavelength, or a combination thereof.

9. The inorganic light emitting device of claim 3 wherein the polycrystalline inorganic light emitting layer is an annealed film of a colloidal dispersion of ternary core/shell nanocrystals and semiconductor matrix nanoparticles.

10. A single photon optoelectronic device comprising:
    (a) two spaced apart electrodes; and
    (b) a single ternary core/shell nanocrystal disposed between the two spaced apart electrodes and having a ternary semiconductor core containing a gradient in alloy composition and exhibiting single molecule non-blinking behavior characterized by on times greater than one minute or radiative lifetimes less than 10 ns.

11. The optoelectronic device of claim 10, wherein the device is included in a quantum computing or a quantum cryptography device.

12. An optical device comprising:
    (a) at least one layer containing ternary core/shell nanocrystal(s) wherein the ternary core/shell nanocrystal(s) have ternary semiconductor cores containing a gradient in alloy composition and exhibit single molecule non-blinking behavior characterized by on times greater than one minute or radiative lifetimes less than 10 ns; and
    (b) a light source for optically exciting the ternary core/shell nanocrystal(s) so as to cause emission of light from the ternary core/shell nanocrystal(s).

13. The optical device of claim 12 wherein the device is a single photon optical device, and wherein the at least one layer comprises a single ternary core/shell nanocrystal and the light source is a laser.

14. The single photon optical device of claim 13, wherein the device is included in a quantum computing or a quantum cryptography device.

15. The optical device of claim 12, wherein the light source is an inorganic LED, an organic LED, a laser, or a compact fluorescent lamp.

16. The optical device of claim 12, wherein the ternary core/shell nanocrystal(s) have an emission wavelength selected from an ultraviolet, blue, cyan, green, yellow, magenta, red, or infrared emission wavelength, or a combination thereof.

17. A system including a marker actuable by radiation and used to detect a given analyte, comprising:
    (a) a ternary core/shell nanocrystal, having a ternary semiconductor core containing a gradient in alloy composition and exhibiting single molecule non-blinking behavior characterized by on times greater than one minute or radiative lifetimes less than 10 ns; and
    (b) a molecule conjugated with the ternary core/shell nanocrystal and having a binding affinity for the analyte.

18. The system of claim 17 further including:
    (c) a medium containing the given analyte, and;
    (d) a light source for illuminating the marker with radiation that causes the emission of light from the conjugated ternary core/shell nanocrystal that is analyzed to determine the presence of the analyte.

* * * * *